(12) United States Patent
Sakamoto

(10) Patent No.: US 12,039,209 B2
(45) Date of Patent: Jul. 16, 2024

(54) IMAGE PROCESSING APPARATUS, PRINTING SYSTEM, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Mitsuaki Sakamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/161,206

(22) Filed: Jan. 30, 2023

(65) Prior Publication Data

US 2023/0273756 A1 Aug. 31, 2023

(30) Foreign Application Priority Data

Feb. 25, 2022 (JP) ................. 2022-028378

(51) Int. Cl.
*G06F 3/12* (2006.01)
*H04N 1/00* (2006.01)

(52) U.S. Cl.
CPC ............ *G06F 3/121* (2013.01); *G06F 3/1258* (2013.01); *H04N 1/00037* (2013.01); *H04N 1/00039* (2013.01)

(58) Field of Classification Search
USPC ....................... 358/1.14, 1.15, 1.9
See application file for complete search history.

(56) References Cited

U.S. PATENT DOCUMENTS

| 2012/0182566 A1* | 7/2012 | Sawano | H04N 1/00023 358/1.9 |
| 2021/0073967 A1 | 3/2021 | Imai | |
| 2021/0216261 A1* | 7/2021 | Kobashi | G06F 3/1206 |
| 2022/0028047 A1* | 1/2022 | Mashiko | H04N 1/00034 |

FOREIGN PATENT DOCUMENTS

| JP | 2014-185941 A | 10/2014 |
| JP | 2016-118446 A | 6/2016 |
| JP | 5994698 B2 | 9/2016 |
| JP | 2017-202627 A | 11/2017 |
| JP | 6665671 B2 | 3/2020 |

OTHER PUBLICATIONS

Jun. 21, 2023 European Official Action in European Patent Appln. No. 23153183.1.

* cited by examiner

*Primary Examiner* — Quang N Vo
(74) *Attorney, Agent, or Firm* — Venable LLP

(57) ABSTRACT

There is provided with an image processing apparatus. A setting unit sets priority degrees in a printed image. A display control unit displays, in an order that is in accordance with the set priority degrees, print failures identified by inspecting a read image obtained by reading the printed image.

16 Claims, 17 Drawing Sheets

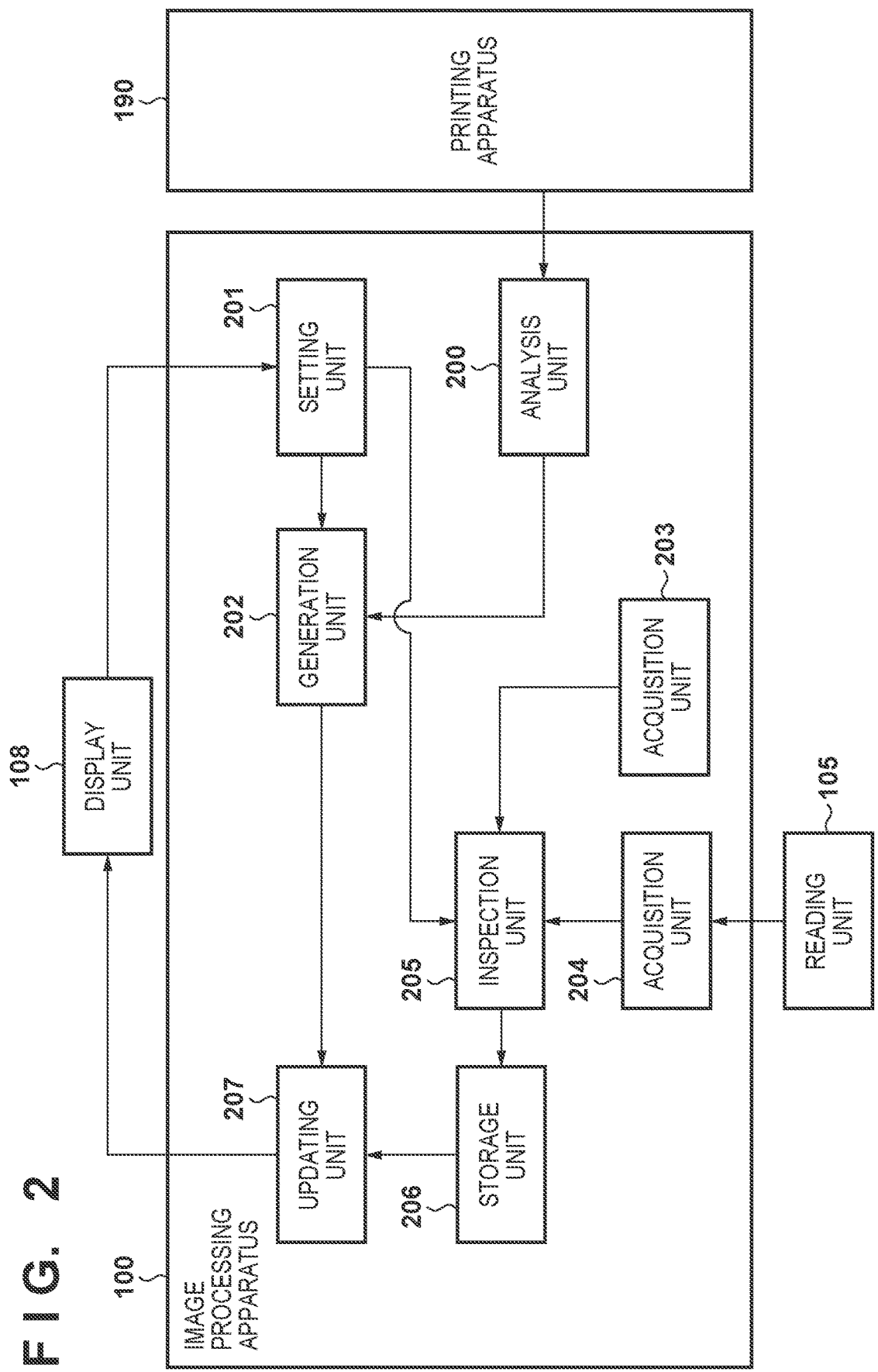

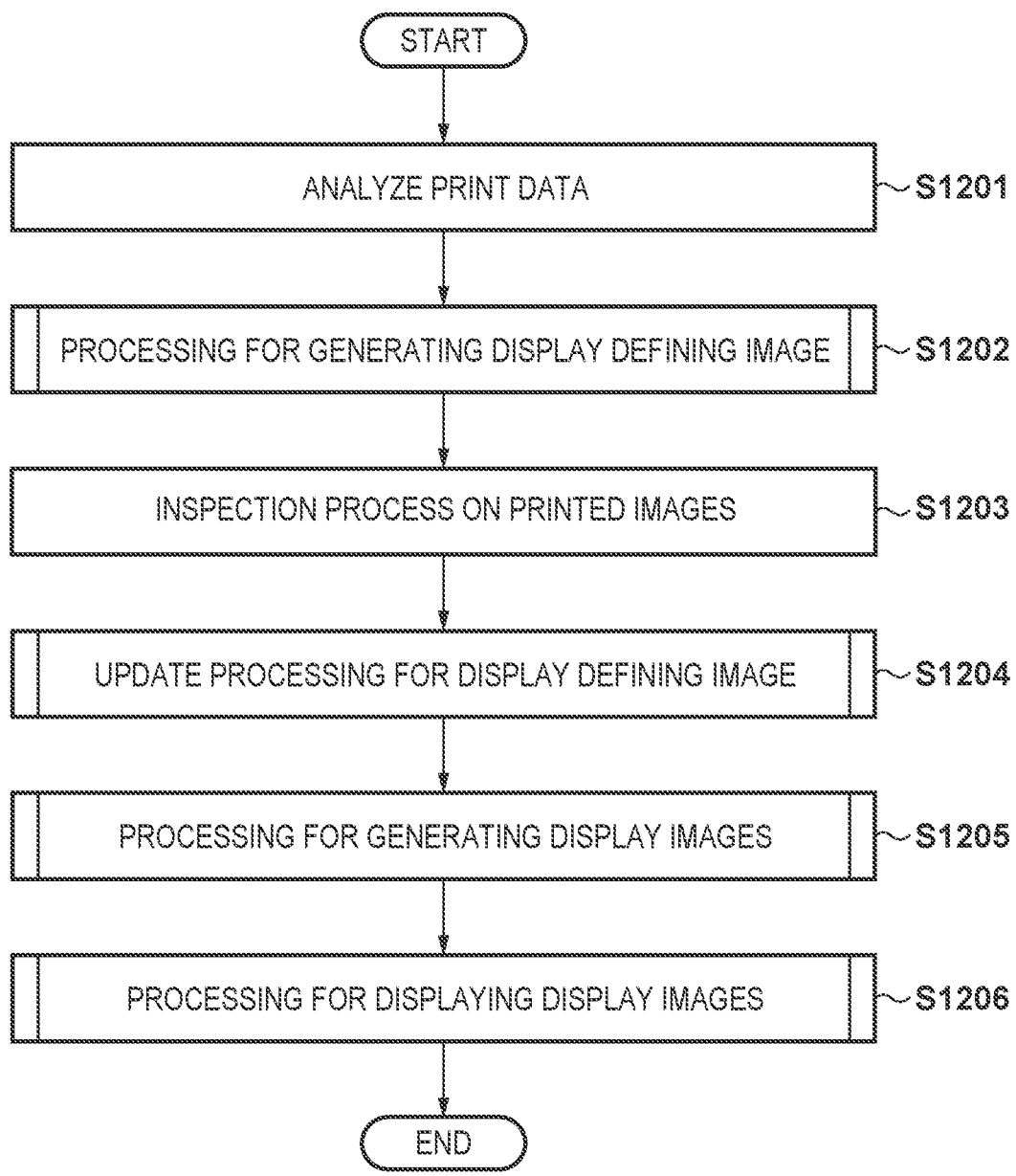

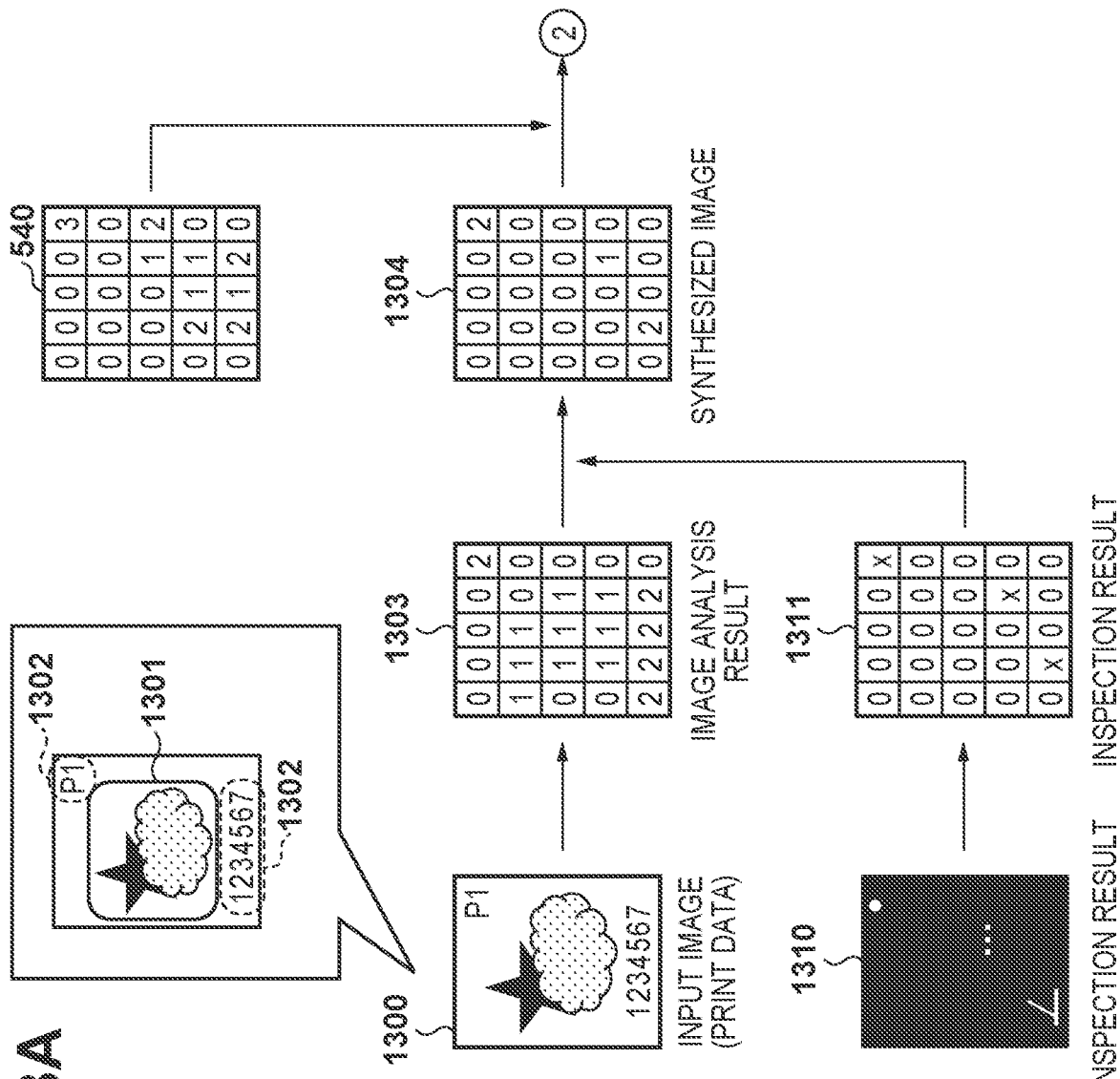

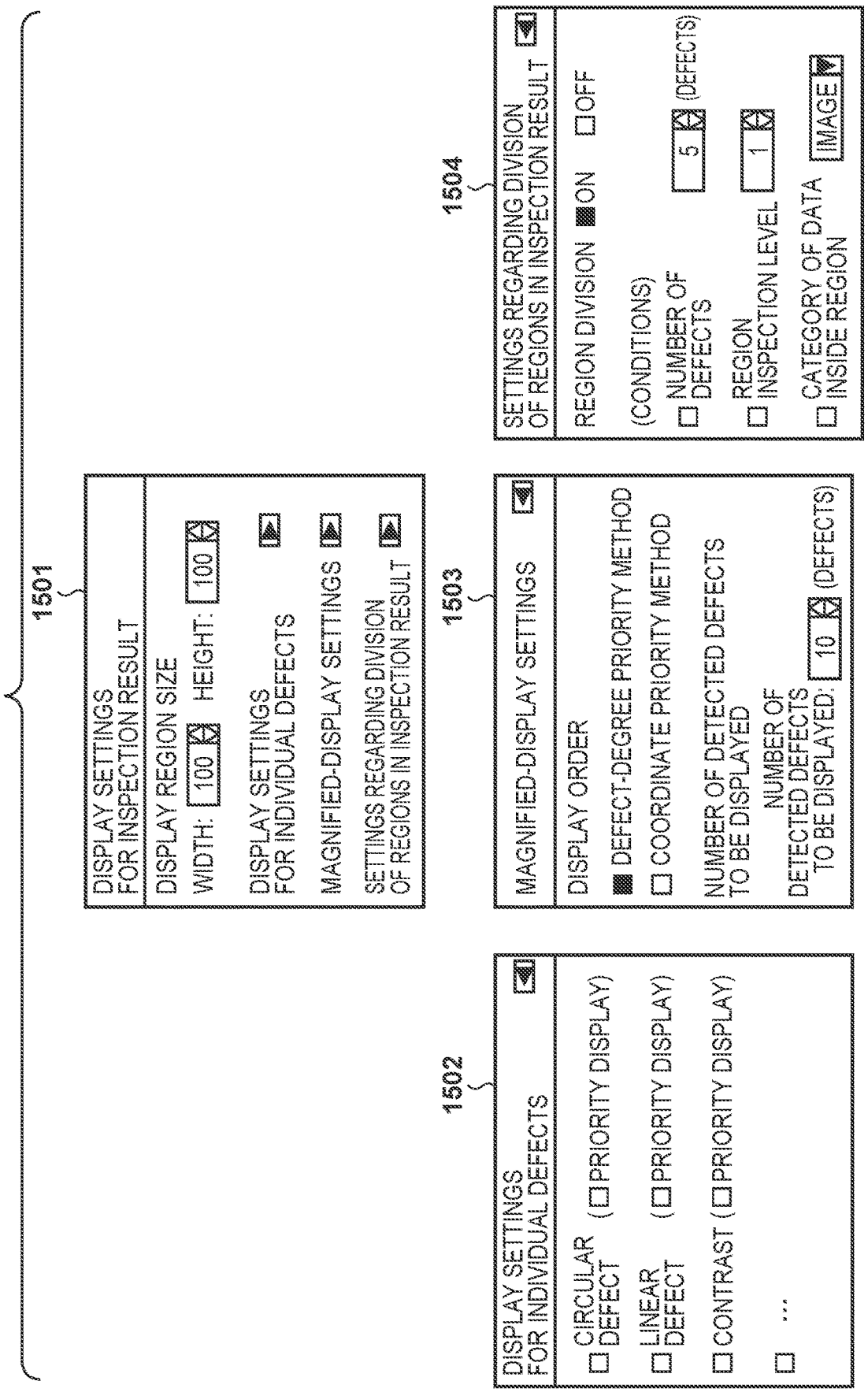

IMAGE PROCESSING APPARATUS, PRINTING SYSTEM, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus, a printing system, an image processing method, and a non-transitory computer-readable storage medium.

Description of the Related Art

In the printing industry, inspection work is performed after printout in order to guarantee that printed matter to be delivered to an order does not include defects and has satisfactory quality. While printed matter is inspected by people, this work is costly. Thus, techniques for automating the inspection of printed matter are being developed. For example, image data of satisfactory printed matter (such image data referred to in the following as a reference image) is created in advance. Next, image data of inspection-target printed matter (such image data referred to in the following as a read image) is acquired by means of scanning using a reader apparatus, image-capturing using an image-capturing apparatus, or the like. Then, the printed matter is inspected by comparing the reference and read images. An image processing apparatus determines that there is a print failure in the printed matter if the difference between the reference and read images exceeds a threshold.

If a print-failure region is detected from a read image, it is necessary to discard the read image and reprint the printed matter. However, even if a print-failure region is detected from a read image, there are cases in which, depending on the position of the print-failure region in the read image and the degree of the print failure, the printed matter can be treated as a satisfactory product. Furthermore, while inspection efficiency is improved by automating the inspection of printed matter, a large number of read images need to be processed. Thus, if a print-failure region is detected from a read image, it is difficult to immediately ascertain which portion of which page the print-failure region has been detected in.

In view of this, Japanese Patent No. 6665671 proposes generating rectangular data including a print-failure region for print-failure regions that have occurred locally in a read image, and providing a notification regarding the print-failure regions to a user in the form of a report or the like. Furthermore, Japanese Patent No. 5994698 proposes improving the efficiency of the inspection of printed matter by sequentially displaying detected print-failure regions in the order from print-failure regions in which the difference between the reference and read images is greater.

However, in Japanese Patent No. 6665671, because the user is notified of uniform rectangular images, the user needs to determine portions of the rectangular images that need to be checked with priority. Furthermore, in Japanese Patent No. 5994698, an image processing apparatus compares reference and read images, and performs sequential display from portions of print-failure regions with a higher degree of failure. Here, although depending on the type of printed matter, even the slightest of print failures are not tolerated in some printed matter. On the other hand, depending on the position of the print-failure region, the type of print failure, and whether or not post-processing can be performed after printing, there are cases in which a print failure detected from a read image is not a problem. In this case, a user understanding the printing work flow needs to judge the degree of the print failure in relation to the print-failure region. In conventional technology, in order to judge the degrees of print failures in print-failure regions, it was necessary to check what kind of processes in the printing work flow are applied to each read image. Thus, a decrease in the efficiency of the inspection of printed matter was experienced in some cases.

SUMMARY OF THE INVENTION

In view of this, an object of the present invention is to improve the efficiency of inspection of printed matter.

The present invention in its one aspect provides an image processing apparatus comprising a setting unit configured to set priority degrees in a printed image, and a display control unit configured to display, in an order that is in accordance with the set priority degrees, print failures identified by inspecting a read image obtained by reading the printed image.

The present invention in its one aspect provides an image processing method comprising setting priority degrees in a printed image, and displaying, in an order that is in accordance with the set priority degrees, print failures identified by inspecting a read image obtained by reading the printed image.

The present invention in its one aspect provides a non-transitory computer-readable storage medium storing instructions that, when executed by a computer, cause the computer to perform an image processing method comprising setting priority degrees in a printed image, and displaying, in an order that is in accordance with the set priority degrees, print failures identified by inspecting a read image obtained by reading the printed image.

Further features of the present invention will become apparent from the following description of exemplary embodiments (with reference to the attached drawings).

BRIEF DESCRIPTION OF THE DRAWINGS

FIG. 2 is a block diagram illustrating one example of a functional configuration of an image processing apparatus pertaining to a first embodiment.

FIG. 12 is a flowchart describing a flow of image processing pertaining to the second embodiment.

FIG. 13A is a schematic diagram of processing for updating a defining image based on an image analysis result pertaining to the second embodiment.

FIG. 15 is a diagram illustrating one example of setting screens displayed on a user interface.

DESCRIPTION OF THE EMBODIMENTS

Figure 1:
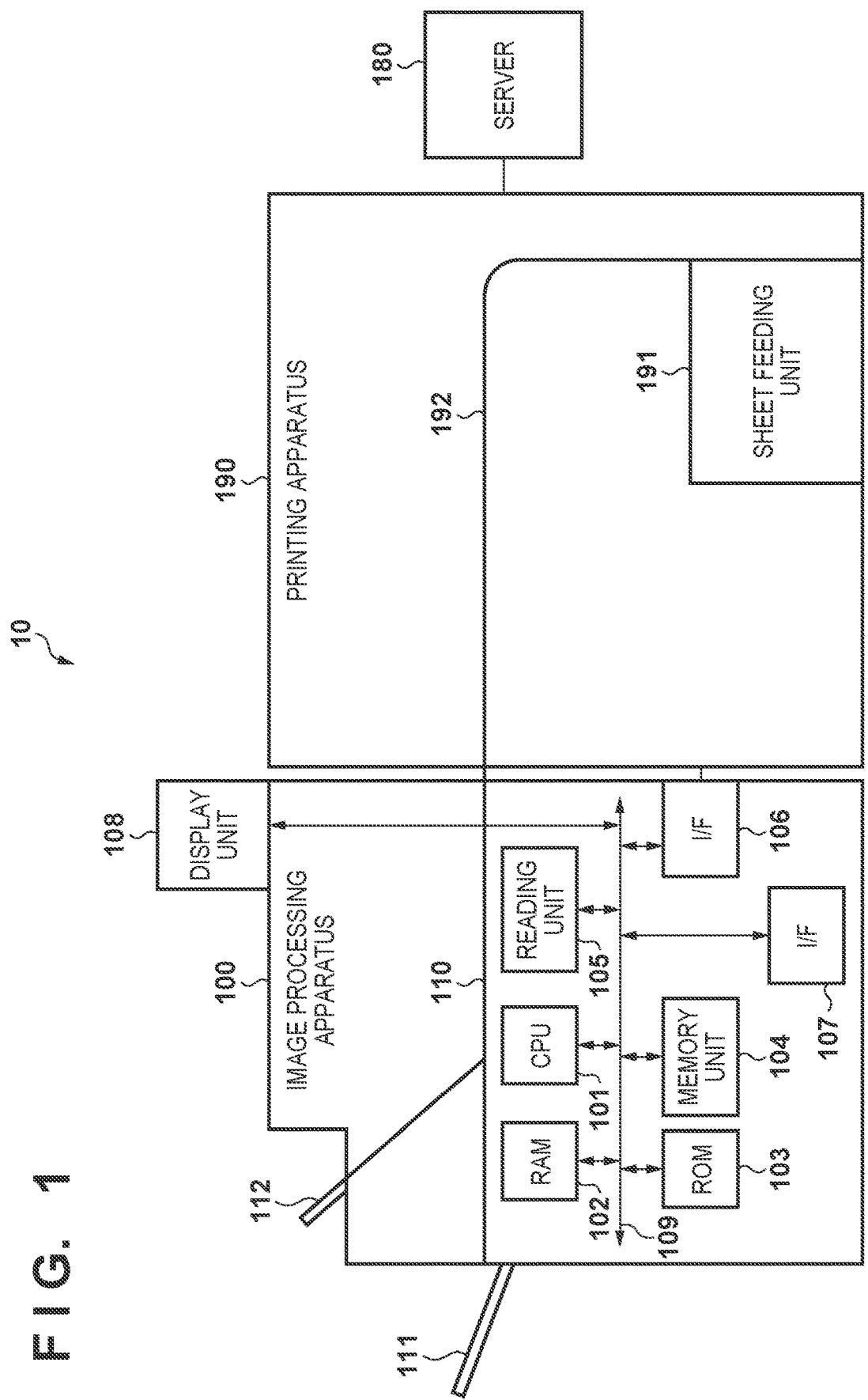
FIG. 1 is a diagram illustrating one example of a configuration of a printing system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

An image processing apparatus sets priority degrees in a printed image. The image processing apparatus displays, in an order that is in accordance with the set priority degrees, print failures identified by inspecting a read image obtained by reading the printed image.

The priority degrees (rank values) define display priority, and are real-number values of 0 or more, for example. The lower the value among the real-number values or 0 of more, the higher the priority degree. In the present embodiment, regions with a rank value "0" are regions that are excluded from the generation of display images. Thus, the priority degrees are used while taking rank values of "1" or more into consideration. Note that the priority degrees are not limited to being real-number values, and priority may be defined in values such as decimals or fractions or in other forms, such as symbols. Note that the present embodiment can be used as a printing system in which the image processing apparatus, a server, and a printing apparatus are combined.

FIG. 1 is a diagram illustrating one example of a configuration of the printing system. A printing system 10 includes an image processing apparatus 100, a server 180, and a printing apparatus 190. The printing system 10 outputs printed matter based on print data, and inspects the printed matter.

The image processing apparatus 100 includes a CPU 101, a RAM 102, a ROM 103, a memory unit 104, a reading unit 105, an interface 106, an interface 107, a display unit 108, a bus 109, a conveyance path 110, a sheet discharge tray 111, and a sheet discharge tray 112. The image processing apparatus 100 inspects whether or not print-failure regions are present in read images obtained by reading images (printed matter) formed by the printing apparatus 190. Note that the image processing apparatus 100 need not include all of the above-described configurations, and may be realized using a computer that includes only the CPU 101, the RAM 102, and the ROM 103. In this case, the memory unit 104, the reading unit 105, the display unit 108, etc., can be realized as devices that are separate from the image processing apparatus 100.

The CPU 101 is a processor that integrally controls the units in the image processing apparatus 100.

The RAM 102 functions as a main memory, a work area, etc., of the CPU 101.

The ROM 103 stores a group of programs executed by the CPU 101.

The memory unit 104 stores applications executed by the CPU 101, data used for image processing, etc.

The reading unit 105 reads, on the conveyance path 110, one or both sides of printed matter sent from the printing apparatus 190, and performs conversion into image data (read image(s)). For example, the reading unit 105 is a line scanner.

The interface 106 is an interface that connects the printing apparatus 190 and the image processing apparatus 100 to one another. The interface 106 can establish synchronization of timings relating to processing of printed matter with the printing apparatus 190, and performs mutual communication of operation states between the printing apparatus 190 and the image processing apparatus 100.

For example, the interface 107 is a serial bus interface conforming to a standard such as Universal Serial Bus (USB) or IEEE 1394. The interface 107 allows a user to take out data inside the image processing apparatus 100, such as logs, using a USB device.

The display unit 108 is a device that displays various types of data, and includes a liquid crystal display (LCD), for example. The display unit 108 displays a user interface (UI) on the liquid crystal display. Furthermore, the display unit 108 displays screens indicating the current printing status, print settings, etc. The display unit 108 receives, via a mouse (unillustrated) and/or a keyboard (unillustrated) connected to the interface 107, for example, print setting information including a sheet size, a sheet type, etc., set by the user.

The bus 109 is a data bus that connects the components of the image processing apparatus 100 to one another. The CPU 101 provides instructions to the units in the image processing apparatus 100 and the units in the printing system 10 via the bus 109. For example, based on results of the inspection, the CPU 101 conveys printed matter to the sheet discharge tray 111 or to the sheet discharge tray 112 via the conveyance path 110.

The conveyance path 110 is connected to a conveyance path 192 in the printing apparatus 190.

The sheet discharge tray 111 is a tray that outputs printed matter that has passed the inspection to the outside of the image processing apparatus 100.

The sheet discharge tray 112 is a tray that outputs printed matter that did not pass the inspection to the outside of the image processing apparatus 100.

The server 180 generates print jobs relating to printed matter to be printed, and transmits the print jobs to the printing apparatus 190.

The printing apparatus 190 forms images on a recording medium (paper) based on the print jobs received from the server 180. The printing apparatus 190 includes a sheet feeding unit 191. The user sets printing sheets to the sheet feeding unit 191 in advance. Upon receiving a print job, the printing apparatus 190 conveys a printing sheet in the sheet feeding unit 191 along the conveyance path 192, and forms an image on one or both sides of the printing sheet. The printing apparatus 190 sends the formed images to the image processing apparatus 100 via the conveyance path 192.

FIG. 2 is a block diagram illustrating one example of a functional configuration of the image processing apparatus pertaining to the first embodiment. The image processing apparatus 100 includes an analysis unit 200, a setting unit 201, a generation unit 202, an acquisition unit 203, an acquisition unit 204, an inspection unit 205, a storage unit 206, and an updating unit 207.

The analysis unit 200 analyzes a print job received by the printing apparatus 190. Note that the analysis unit 200 may directly acquire the print job from the server 180.

The setting unit 201 sets inspection conditions to be applied to a read image based on inspection conditions set by the user via the display unit 108. For example, the setting unit 201 sets inspection regions in the read image and sets inspection priority degrees (rank values) to the inspection regions.

Based on the analysis result of the print job (print settings) and inspection settings, the generation unit 202 generates a defining image defining which regions are to be displayed with priority when print-failure regions are detected from the read image.

The acquisition unit 203 acquires, from the memory unit 104 or the like, a reference image that is to be used as a reference in the inspection.

The acquisition unit 204 acquires the read image to be inspected from the reading unit 105. The read image is an image obtained by reading printed matter on the conveyance path 110 using the reading unit 105.

The inspection unit 205 inspects whether or not there are print-failure regions in the read image by comparing the reference and read images.

The storage unit 206 stores the result of the inspection of the read image by the inspection unit 205. Note that the result of the inspection of the read image by the inspection unit 205 may be stored in another device instead of the storage unit 206.

Based on the defining image and the inspection result of the read image, the updating unit 207 updates the rank values of regions of the defining image. Furthermore, based on the updated defining image, the updating unit 207 generates regions to be displayed (display images) from the read image, and transmits the display images to the display unit 108. Note that the updating unit 207 corresponds to the display control means.

Figure 3A:
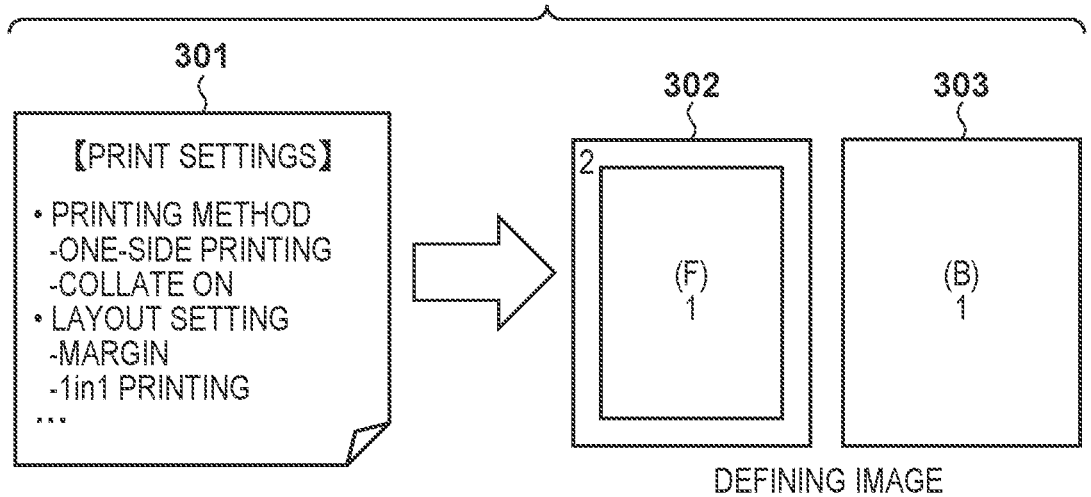
FIG. 3A is a schematic diagram of defining images pertaining to the first embodiment.
Figure 3B:
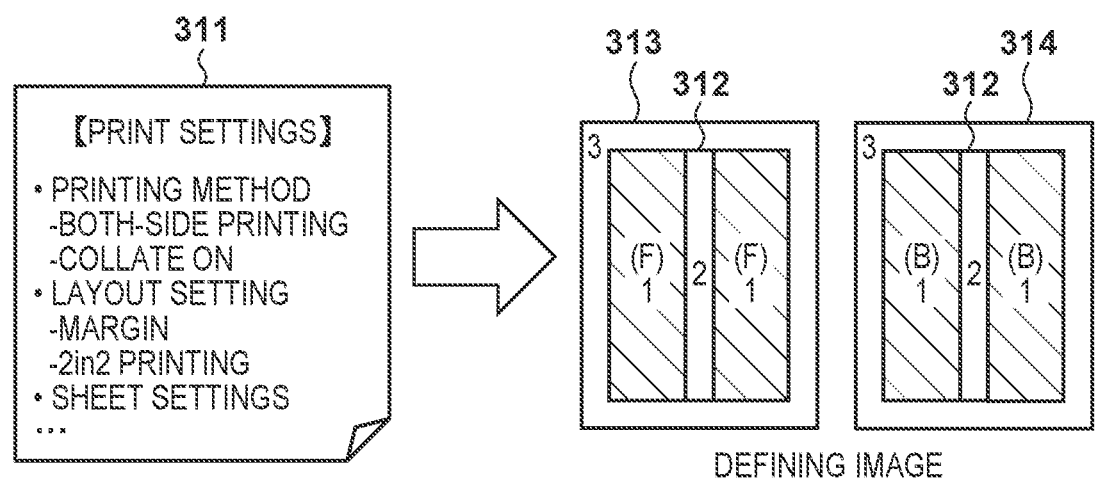
FIG. 3B is a schematic diagram of defining images pertaining to the first embodiment.
Figure 3C:
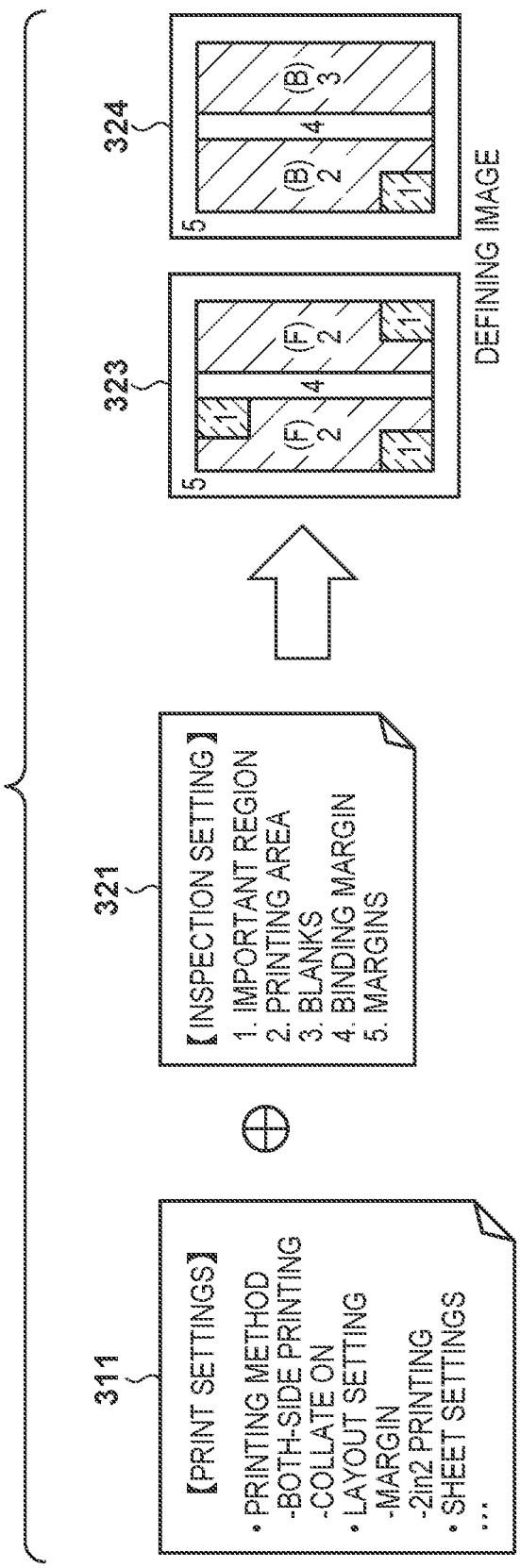
FIG. 3C is a schematic diagram of defining images pertaining to the first embodiment.

FIGS. 3A to 3C are schematic diagrams of defining images pertaining to the first embodiment.

In FIG. 3A, print settings 301 are settings applied upon printing printed matter using the printing apparatus 190. For example, the print settings 301 include setting information such as a printing method (one-side printing, both-side printing), a layout setting (1-in-1, 2-in-1), a sheet size (B5, A3), and a sheet type (regular paper, gloss paper).

The generation unit 202 generates a defining image 302 and a defining image 303 based on the print settings 301. The defining image 302 corresponds to read image(s) obtained by reading the front side(s) of the printed matter. The defining image 303 corresponds to read image(s) obtained by reading the back side(s) of the printed matter. Here, if the print settings 301 include setting information indicating one-side printing and bordered printing, a region positioned away inward from the sides of the defining image 302 by a predetermined amount corresponds to read image(s). Furthermore, because the print settings 301 include setting information indicating one-side printing, the defining image 303 is a white image.

In FIG. 3B, print settings 311 are settings applied upon causing the printing apparatus 190 to print printed matter. The print settings 311 include information similar to that in the print settings 301.

Here, if the print settings 311 include information indicating sheet layout settings (2-in-2 and binding margin), a defining image 313 and a defining image 314 each include two regions. Furthermore, the defining image 313 and the defining image 314 each include a region 312 indicating the binding margin between the two regions.

In FIG. 3C, the print settings 311 are the settings applied upon printing printed matter using the printing apparatus 190. The print settings 311 include setting information similar to that in the print settings 301. Furthermore, the generation unit 202 generates a defining image 323 and a defining image 324 based on the print settings 311 and inspection settings 321.

The inspection settings 321 include information indicating inspection regions in the defining images 323 and 324 and details of the inspection of the inspection regions. For example, the inspection regions include five regions, namely (1) an important region, (2) a printed region, (3) blanks, (4) a binding margin, and (5) margins. The numerals displayed in the defining images 323 and 324 correspond to the regions defined by the inspection regions.

Figure 4:
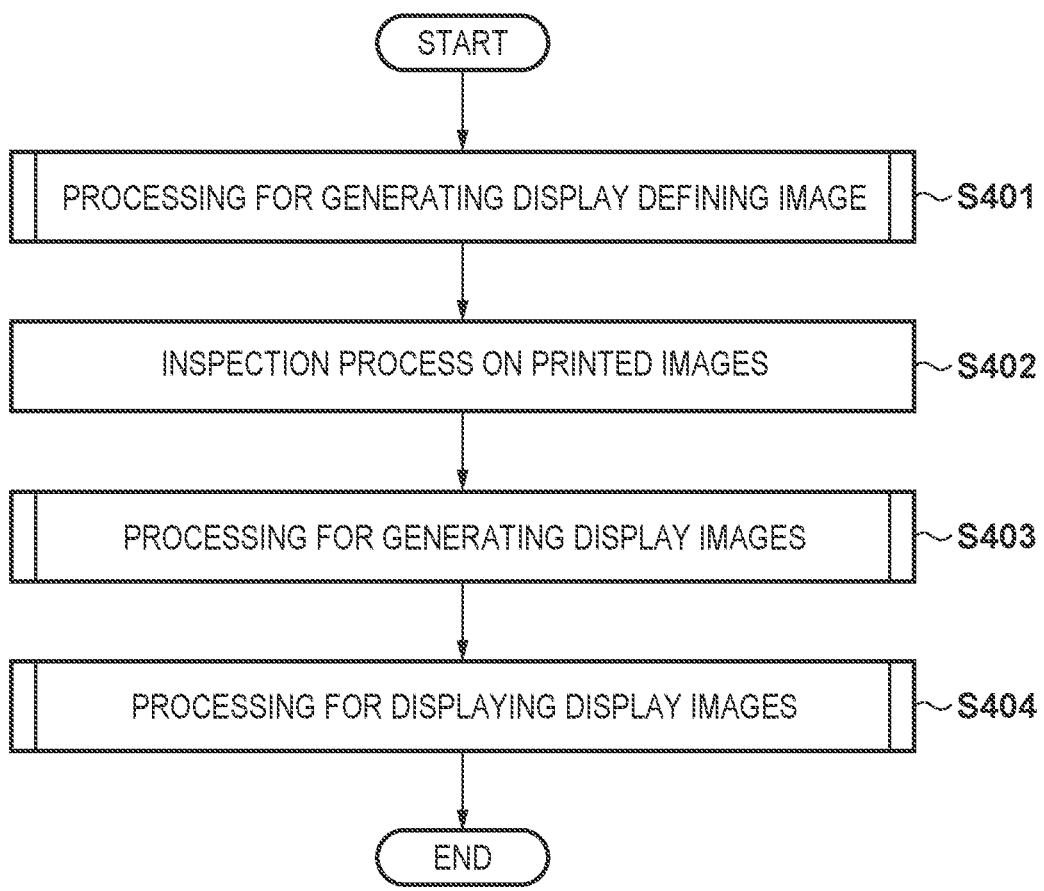
FIG. 4 is a flowchart describing a flow of image processing pertaining to the first embodiment.

FIG. 4 is a flowchart describing a flow of image processing pertaining to the first embodiment. The flowchart in FIG. 4 will be described with reference to FIGS. 3A to 3C.

In step S401, the generation unit 202 acquires the print settings 311, which are analysis results of a print job, from the analysis unit 200, and acquires the inspection settings 321 from the setting unit 201. The generation unit 202 generates the defining images 323 and 324 based on the print settings 311 and the inspection settings 321.

In step S402, the acquisition unit 203 acquires reference images from the memory unit 104. The reference images are images obtained by the reading unit 105 reading printed matter with satisfactory quality. For example, printed matter with satisfactory quality is printed matter without any soiling, or printed matter with soiling that does not affect quality.

The acquisition unit 204 acquires read images obtained by reading printed matter using the reading unit 105.

The inspection unit 205 detects, as print-failure pixels, pixels in which the difference between the reference and read images is more than a threshold. The inspection unit 205 determines that the printed matter has satisfactory quality if no print-failure pixels are detected from the read images. The inspection unit 205 determines that the printed matter has unsatisfactory quality if print-failure pixels are detected from the read images.

The storage unit 206 stores the result of the inspection of the read images by the inspection unit 205.

In step S403, the updating unit 207 generates display images based on the defining image 323 or defining image 324 and the inspection result of a read image. The updating unit 207 generates display images from read images with unsatisfactory quality. However, if the series of inspection processes would not be affected, the updating unit 207 may generate display images from all inspected read images.

In step S404, the display unit 108 displays the display images on a screen based on conditions such as the number of images to be displayed on the screen. Here, conditions such as the number of images to be displayed on the screen are set in advance by the user via the display unit 108.

Figure 5:
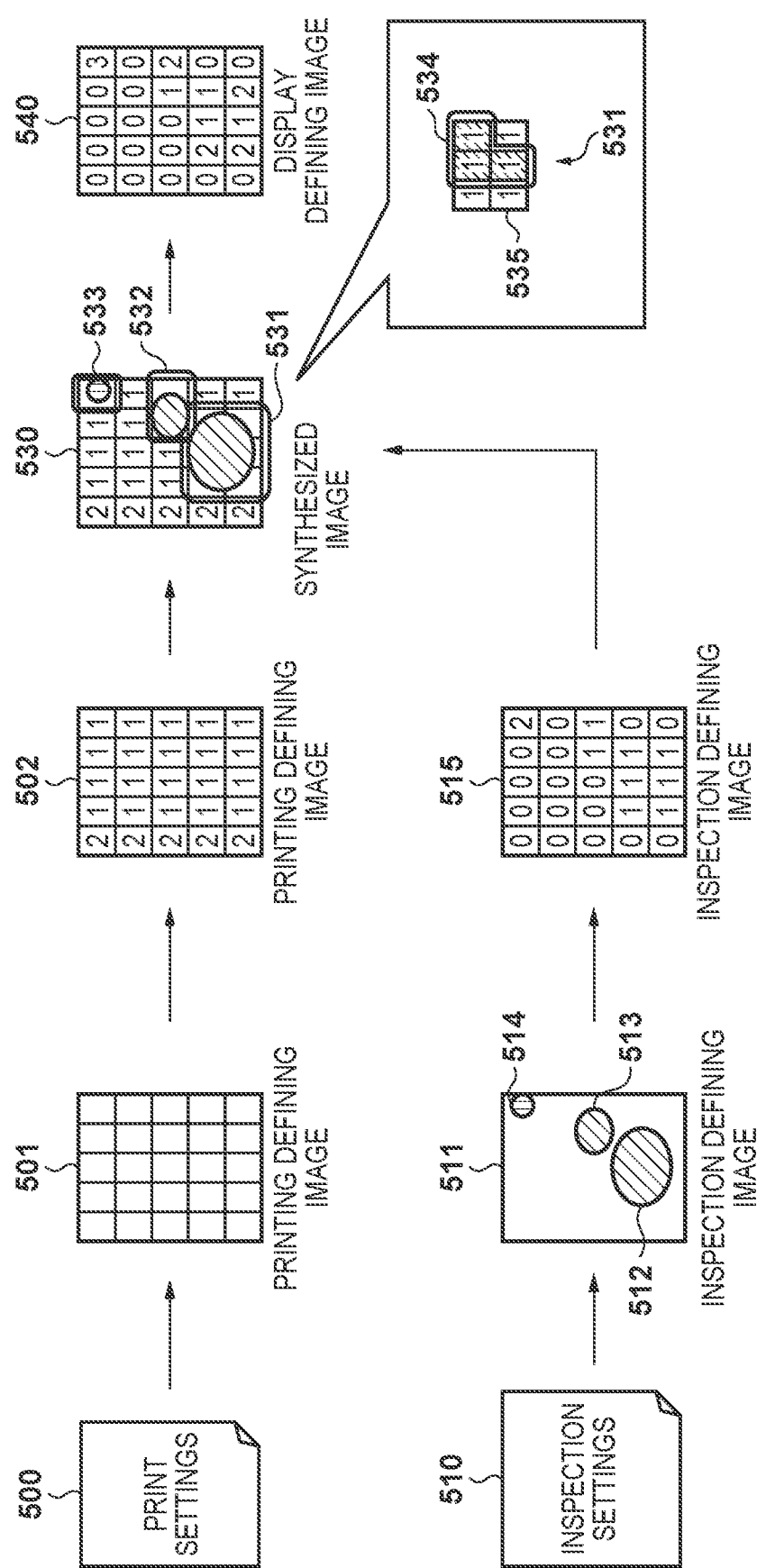
FIG. 5 is a schematic diagram of processing for generating a display defining image pertaining to the first embodiment.

FIG. 5 is a schematic diagram of processing for generating a display defining image pertaining to the first embodiment. The updating unit 207 generates a display defining image 540 based on print settings 500 and inspection settings 510.

The generation unit 202 acquires the print settings 500 from the analysis unit 200. The print settings 500 are results of an analysis of a print job by the analysis unit 200. Based on the print settings 500, the generation unit 202 generates a printing defining image 501 in which a read image is divided into grid-shaped regions. For example, the generation unit 202 generates a printing defining image 501 including 25 (=5×5) regions based on the sheet size included in the print settings 500.

Based on the print settings 500, the generation unit 202 generates a printing defining image 502 in which rank values have been set to the regions in the printing defining image 501. The rank values are displayed as 1 or 2 in the printing defining image 502.

Based on the inspection settings 510 acquired from the setting unit 201, the generation unit 202 generates an inspection defining image 511. The inspection settings 510 include information of inspection regions in the read image, and information defining inspection conditions of the inspection regions. The inspection defining image 511 is an image in which the inspection regions in the inspection settings 510 are visualized. A region 512 (illustrated as an oval), a region 513 (illustrated as an oval), and a region 514 (illustrated as a circle) are displayed in the inspection defining image 511. The regions 512 to 514 are regions of a read image to be inspected. A rank value "1" is set to the regions 512 and 513. A rank value "2" is set to the region 514.

The generation unit 202 generates an inspection defining image 515 by dividing the inspection defining image 511 into 25 (=5×5) regions, similarly to the printing defining image 501. The generation unit 202 generates the inspection defining image 515 based on the rank values of the regions 512 to 514.

The generation unit 202 generates a synthesized image 530 by superimposing the inspection defining image 515 onto the printing defining image 502. The regions 512, 513, and 514 in the inspection defining image 511 respectively correspond to regions 531, 532, and 533 in the synthesized image 530. The region 531 covers six regions in the synthesized image 530. The region 532 covers two regions in the synthesized image 530. The region 533 covers one region in the synthesized image 530.

The updating unit 207 generates the display defining image 540 by updating the rank values of the regions in the synthesized image 530 based on the later-described processing in FIG. 8. Note that, while the generation unit 202 determines the number of regions in the printing defining image 501 based on the sheet size included in the print settings 500, the number and shapes of regions may be determined based on the inspection settings 510. Furthermore, the generation unit 202 may determine the number of regions in the printing defining image 501 by taking the size and resolution of a display region of the screen of the display unit 108 into consideration.

Figure 6:
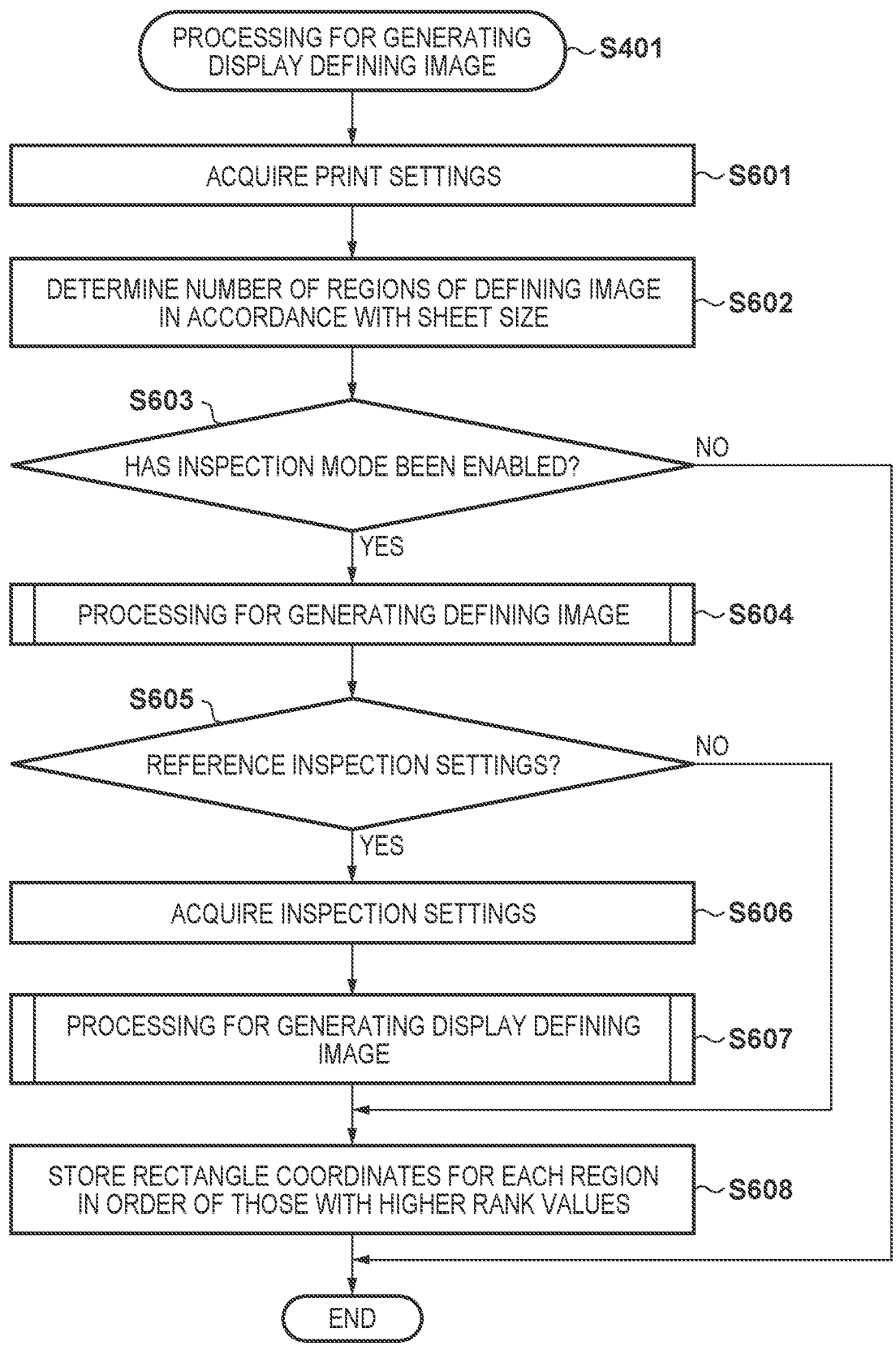
FIG. 6 is a flowchart illustrating a flow of the processing for generating a defining image.

FIG. 6 is a flowchart illustrating a flow of processing for generating a defining image. The flowchart in FIG. 6 will be described with reference to FIG. 5.

In step S601, the generation unit 202 acquires the print settings 500 from the analysis unit 200. For example, the generation unit 202 acquires print setting information such as a sheet size (B5, A3, etc.), a layout (1-in-1, etc.), and the total number of pages.

In step S602, the generation unit 202 generates the printing defining image 501 by determining the number of regions in the printing defining image 501 based on the printing sheet size included in the print settings 500.

In step S603, the inspection unit 205 determines whether or not an inspection mode for inspecting read images is enabled. Upon determining that the inspection mode is not enabled (No in step S603), the inspection unit 205 terminates processing without inspecting read images. Upon determining that the inspection mode is enabled (Yes in step S603), the inspection unit 205 advances processing to step S604.

In step S604, the generation unit 202 generates the printing defining image 502 by setting rank values to the regions in the printing defining image 501 based on the print settings 500.

In step S605, the generation unit 202 determines whether there are inspection settings 510 that can be acquired from the setting unit 201. Upon determining that there are inspection settings 510 that can be acquired from the setting unit 201 (Yes in step S605), the generation unit 202 advances processing to step S606. Upon determining that there are no inspection settings 510 that can be acquired from the setting unit 201 (No in step S605), the generation unit 202 advances processing to step S608.

In step S606, based on the inspection settings 510 acquired from the setting unit 201, the generation unit 202 generates the inspection defining image 515.

In step S607, the generation unit 202 generates the synthesized image 530 by superimposing the inspection defining image 515 onto the printing defining image 502. The updating unit 207 generates the display defining image 540 by updating the rank values of the regions in the synthesized image 530.

In step S608, the updating unit 207 stores, in the memory unit 104, information in which the rank values of the regions in the display defining image 540 and information of the regions (for example, two-dimensional coordinates (X, Y) of rectangular regions) are associated with one another. Note that the updating unit 207 stores the above-described information in the memory unit 104 in the order of those with higher rank values.

Figure 7A:
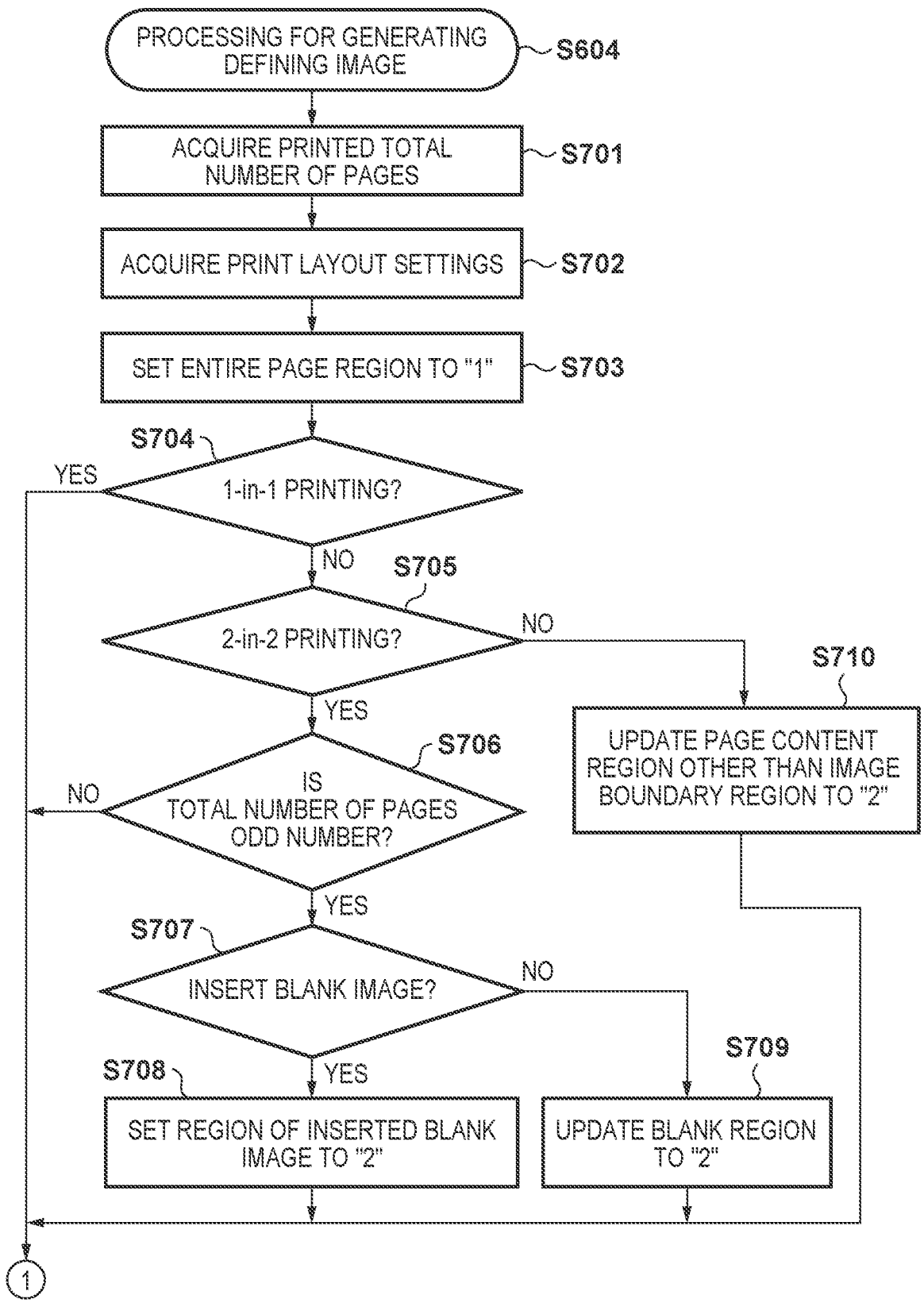
FIG. 7A is a flowchart illustrating a flow of processing for generating defining images based on print settings.
Figure 7B:
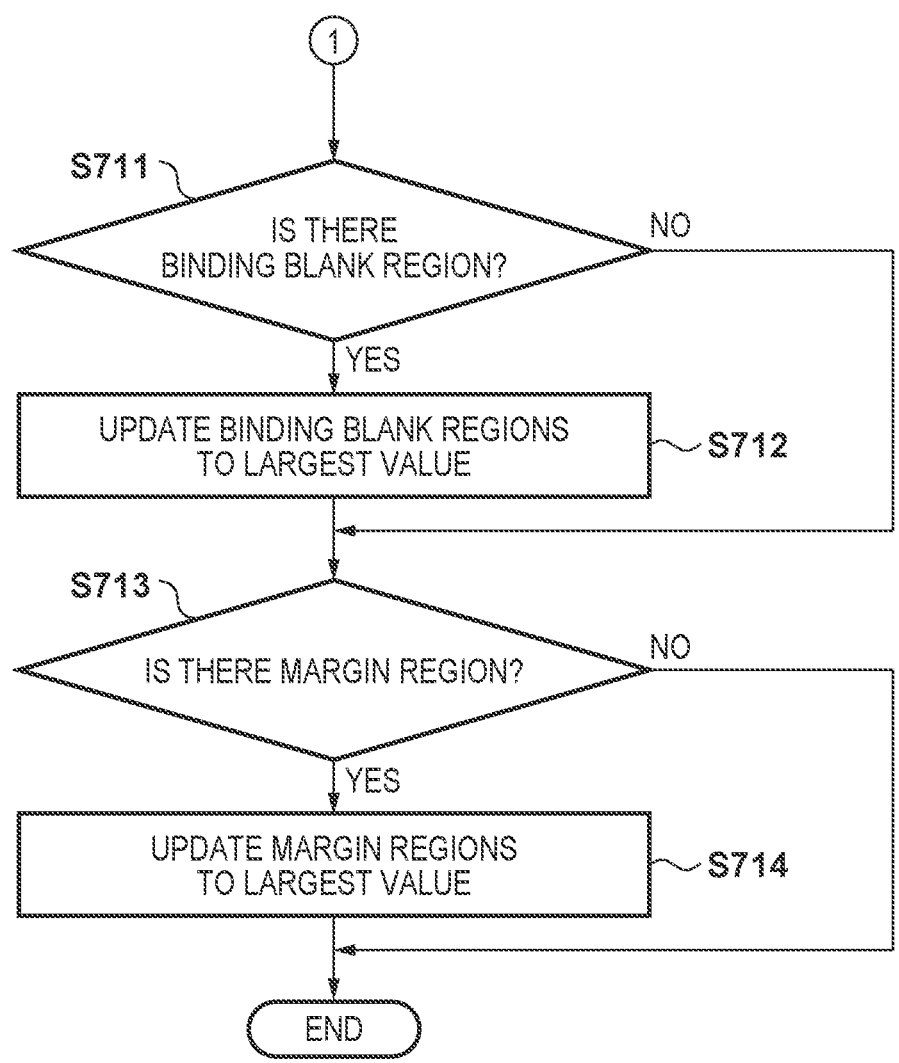
FIG. 7B is a flowchart illustrating a flow of processing for generating defining images based on print settings.

FIGS. 7A to 7B is a flowchart illustrating a flow of processing for generating defining images based on print settings. FIGS. 7A to 7B illustrates the processing in step S604 in FIG. 6 in detail. In a defining image, regions in which toner or ink is recorded are set as regions with the highest display priority degree. The smallest value (for example "1") is adopted as the rank value of regions with the highest display priority degree. Furthermore, blanks or blank-paper regions that remain even after post-processing (for example, bookbinding) is performed are set as regions with the second-highest display priority degree. The second-smallest rank value (for example "2") is adopted as the rank value of regions with the second-highest display priority degree. Note that rank values may be changed in accordance with the type of printed matter.

In step S701, based on the print settings 500, the analysis unit 200 acquires information regarding the total number of pages of the printed matter.

In step S702, based on the print settings 500, the analysis unit 200 acquires layout information such as 1-in-1. The analysis unit 200 acquires information regarding the total number of sheets to be printed based on the information regarding the total number of pages of the printed matter and the layout information. For example, if the total number of pages is ten and both-side 1-in-1 printing is set, the analysis unit 200 calculates that the total number of sheets to be printed is ten pages. Furthermore, if the total number of pages is ten and both-side 2-in-1 printing is set, the analysis unit 200 calculates that the total number of sheets to be printed is five pages.

In step S703, the generation unit 202 sets the rank value "1" to all regions in printing defining images 502 corresponding to the total number of sheets to be printed. Here, the same rank value "1" is set to all regions in the printing defining images 502 because the generation unit 202 does not refer to the layout information.

In step S704, based on the print settings 500, the generation unit 202 determines whether or not 1-in-1 printing is set. Upon determining that 1-in-1 printing is set (Yes in step S704), the generation unit 202 advances processing to step S711. Upon determining that 1-in-1 printing is not set (No in step S704), the generation unit 202 advances processing to step S705.

In step S705, based on the print settings 500, the generation unit 202 determines whether or not 2-in-2 printing is set. Upon determining that 2-in-2 printing is set (Yes in step S705), the generation unit 202 advances processing to step S706. Upon determining that 2-in-2 printing is not set (No in step S705), the generation unit 202 advances processing to step S710.

In step S706, based on the print settings 500, the generation unit 202 determines whether or not the total number of pages of printing defining images 502 is an odd number. Upon determining that the total number of pages of printing defining images 502 is an odd number (Yes in step S706), the generation unit 202 advances processing to step S707. Upon determining that the total number of pages of printing defining images 502 is not an odd number (No in step S706), the generation unit 202 advances processing to step S711.

In step S707, based on the print settings 500, the generation unit 202 determines whether or not a blank-page image is to be inserted in the page following the last odd-number page. Upon determining that a blank-page image is to be inserted (Yes in step S707), the generation unit 202 advances processing to step S708. Upon determining that a blank-page image is not to be inserted (No in step S707), the generation unit 202 advances processing to step S709.

In step S708, the generation unit 202 sets the rank value "2" to the blank-page image region. Note that the blank-page image has a display priority degree equivalent to blank regions. Furthermore, the blank-page image is present in the same two-page spread layout as another printing defining image 502 that is not a blank page. Thus, the generation unit 202 may set the rank value "1," which is the same as that set to the printing defining image 502, to the blank-page image. Furthermore, in order to distinguish a blank-page image and blank regions from one another, the generation unit 202 may set a rank value "3" to blank regions.

In step S709, the generation unit 202 sets the rank value "2" to a blank region in which a blank-page image was not inserted. Because the blank region is present in the same two-page spread layout as a printing defining image 502, the blank region has a rank value that is the same as that set to the printing defining image 502.

In step S710, the generation unit 202 sets a rank value to blank regions between an image and another image in collective printing such as N-in-1 printing and poster printing such as 1-in-N printing. Based on the print settings 500, the generation unit 202 sets the rank value "2" to the blank regions.

In step S711, based on the print settings 500, the generation unit 202 determines whether or not regions 312 indicating binding margins are present. Upon determining that regions 312 indicating binding margins are not present (No in step S711), the generation unit 202 advances processing to step S713. Upon determining that regions 312 indicating binding margins are present (Yes in step S711), the generation unit 202 advances processing to step S712.

In step S712, the generation unit 202 sets the largest rank value in the printing defining images 502 to regions indicating binding margins. For example, if the largest rank value in the printing defining images 502 is "2", the generation unit 202 sets the rank value "3" to the regions indicating binding margins in the printing defining images 502.

In step S713, the generation unit 202 determines whether or not margin regions are present in printed images based on the print settings 500. Upon determining that margin regions are not present (No in step S713), the generation unit 202 terminates processing. Upon determining that margin regions are present (Yes in step S713), the generation unit 202 advances processing to step S714.

In step S714, the generation unit 202 sets the largest rank value in the printing defining images 502 to the margin regions, and terminates processing. For example, if the largest rank value in the printing defining images 502 is "3", the generation unit 202 sets a rank value "4" to the margin regions.

Figure 8:
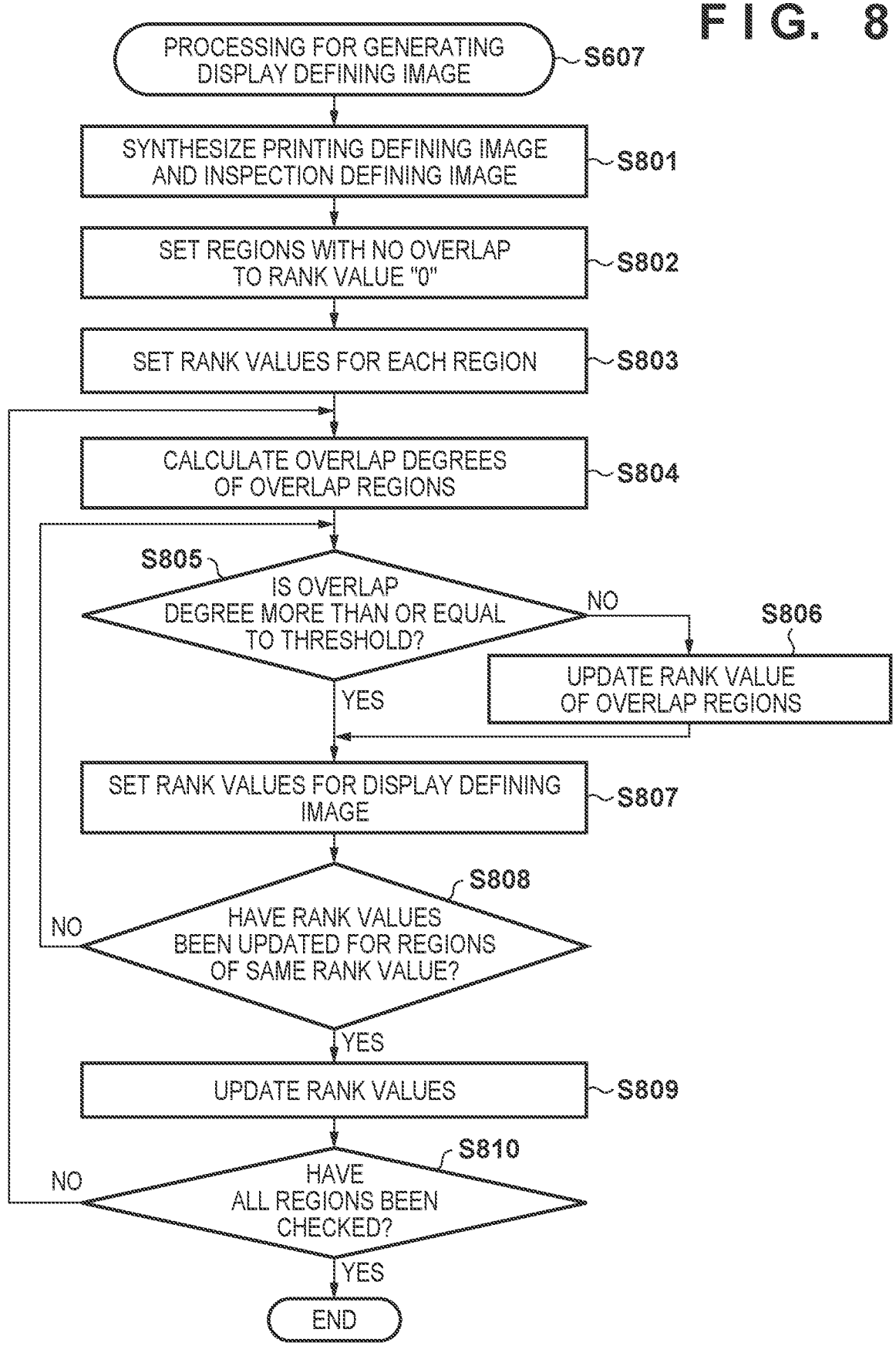
FIG. 8 is a flowchart illustrating a flow of processing for updating a defining image based on inspection settings.

FIG. 8 is a flowchart illustrating a flow of processing for updating a defining image based on inspection settings. The flowchart in FIG. 8 will be described with reference to FIG. 5.

In step S801, the generation unit 202 generates the synthesized image 530 by superimposing the inspection defining image 515 onto the printing defining image 502.

In step S802, the updating unit 207 sets the rank value "0" to regions in the synthesized image 530 where the regions 531, 532, and 533 are not present (regions where there are no overlaps). Note that the later-described display images are not generated from regions with the rank value "0".

In step S803, the updating unit 207 sets the rank values defined in the inspection defining image 515 to the regions (hereinafter "overlap regions") in the synthesized image 530 where the regions 531, 532, and 533 are present. Based on the rank values defined in the inspection defining image 515, the updating unit 207 sets the rank value "1" to the six regions in the region 531 in the synthesized image 530 and the two regions in the region 532 in the synthesized image 530, and sets the rank value "2" to the single region in the region 533 in the synthesized image 530, for example.

In step S804, the updating unit 207 calculates overlap degrees of the overlap regions in the synthesized image 530. The overlap degrees are used to further set a difference in priority degrees to regions having the same rank value in the synthesized image 530. The updating unit 207 uses the area ratios of the regions 512 to 514 in the inspection defining image 511. Note that, instead of calculating the overlap degrees, the updating unit 207 may set priority degrees in the order of the coordinates of the overlap regions, for example.

For example, based on the inspection defining image 515, the updating unit 207 sets the rank value "1" to the six regions in the synthesized image 530 covered by the region 531. The updating unit 207 calculates the overlap degree of the region 532 with respect to each of the two regions in the synthesized image 530 covered by the region 532. An overlap degree is the proportion of a single region in the synthesized image 530 occupied by the area of the region 532. Furthermore, the updating unit 207 calculates the overlap degree of the region 531 with respect to each of the six regions in the synthesized image 530 covered by the region 531.

In step S805, the updating unit 207 determines whether or not the overlap degrees of the regions 531 to 533 are more than or equal to a threshold. Upon determining that the overlap degrees of the regions 531 to 533 are more than or equal to the threshold (Yes in step S805), the updating unit 207 advances processing to step S807. Upon determining that the overlap degrees of the regions 531 to 533 are less than the threshold (No in step S805), the updating unit 207 advances processing to step S806.

The updating unit 207 executes the processing in step S805 with respect to the regions 531 and 532 with a small rank value (for example "1") in the synthesized image 530. By executing the processing in step S805 with respect to the region 531, the updating unit 207 divides the region 531 into three regions that are regions 534 with overlap degrees more than or equal to the threshold and three regions that are regions 535 with overlap degrees less than the threshold.

In step S806, the updating unit 207 updates the rank value of regions in the synthesized image 530 with overlap degrees less than the threshold. For example, the updating unit 207 changes the rank value of the regions 535 with overlap degrees less than the threshold from "1" to "2".

In step S807, the updating unit 207 sets, to regions in the synthesized image 530 with overlap degrees more than or equal to the threshold, the rank value of regions in the printing defining image 502 corresponding to the regions. For example, the updating unit 207 sets, to the regions 534 with overlap degrees more than or equal to the threshold, the rank value "1" of regions in the printing defining image 502 corresponding to the regions 534.

Note that the updating unit 207 sets rank values to the region 532 having the same rank value as the region 531 using the rank value setting method applied to the region 531.

In step S808, the updating unit 207 determines whether or not the updating of rank values has been performed for other regions with the same rank value. Upon determining that the updating of rank values has been performed for other regions with the same rank value (Yes in step S808), the updating unit 207 advances processing to step S809. Upon determining that the updating of rank values has not been performed for other regions with the same rank value (No in step S808), the updating unit 207 returns processing to step S805.

In step S809, the updating unit 207 updates rank values of regions in the synthesized image 530 in order to perform processing of updating the rank value of regions with the rank value "2", which indicates a lower priority degree than the rank value "1".

For example, having completed the updating of rank values of overlap regions overlapping with the regions 531 and 532 in the synthesized image 530, the updating unit 207 does not need to take the regions with the rank value "1" defined in the inspection defining image 515 into consideration. Thus, the updating unit 207 can execute the update processing with respect to the region with the rank value "2" defined in the inspection defining image 515. Here, the updating unit 207 updates the rank value in step S809 because the rank value "2" has been set in the display defining image 540. The updating unit 207 executes the processing from step S805 to S808 because processing for setting a rank value to the region 533 has not been performed yet. Thus, the updating unit 207 can set the rank value "3" to the region in the display defining image 540 corresponding to the region 533.

In step S810, the updating unit 207 determines whether or not the rank values of all regions in the synthesized image 530 have been updated. Upon determining that the updating of rank value has been performed for all regions in the synthesized image 530 (Yes in step S810), the updating unit 207 generates the display defining image 540 and terminates processing. Upon determining that the updating of rank value has not been performed for all regions in the synthesized image 530 (No in step S810), the updating unit 207 returns processing to step S804.

Figure 9:
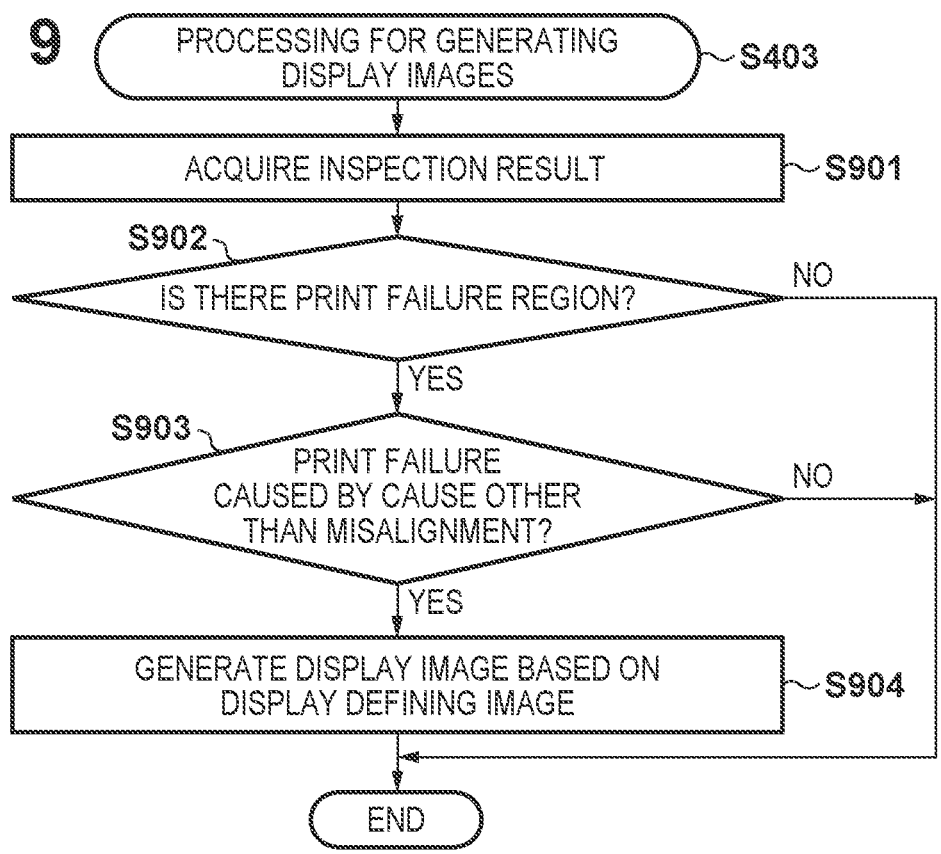
FIG. 9 is a flowchart describing processing for generating display images pertaining to the first embodiment.

FIG. 9 is a flowchart describing a flow of processing for generating display images pertaining to the first embodiment. The processing for generating display images in step S403 of FIG. 4 will be described in detail with reference to FIG. 9.

In step S901, the updating unit 207 acquires, from the storage unit 206, the result of the inspection of a read image by the inspection unit 205.

In step S902, based on the inspection result, the updating unit 207 determines whether or not there are print-failure regions in the read image. Upon determining that there are no print-failure regions in the read image (No in step S902), the updating unit 207 terminates processing. Upon determining that there are print-failure regions in the read image (Yes in step S902), the updating unit 207 advances processing to step S903.

In step S903, based on the inspection result, the updating unit 207 determines whether or not the print failures were caused by a cause other than misalignment. Upon determining that the print failures were caused by misalignment (No in step S903), the updating unit 207 terminates processing. Upon determining that the print failures were caused by a cause other than misalignment (Yes in step S903), the updating unit 207 advances processing to step S904.

In step S904, the updating unit 207 generates regions in the read image corresponding to regions in the display defining image 540 having a rank value that is "1" or more as display images, and stores the display images to the memory unit 104 or the like.

Figure 10:
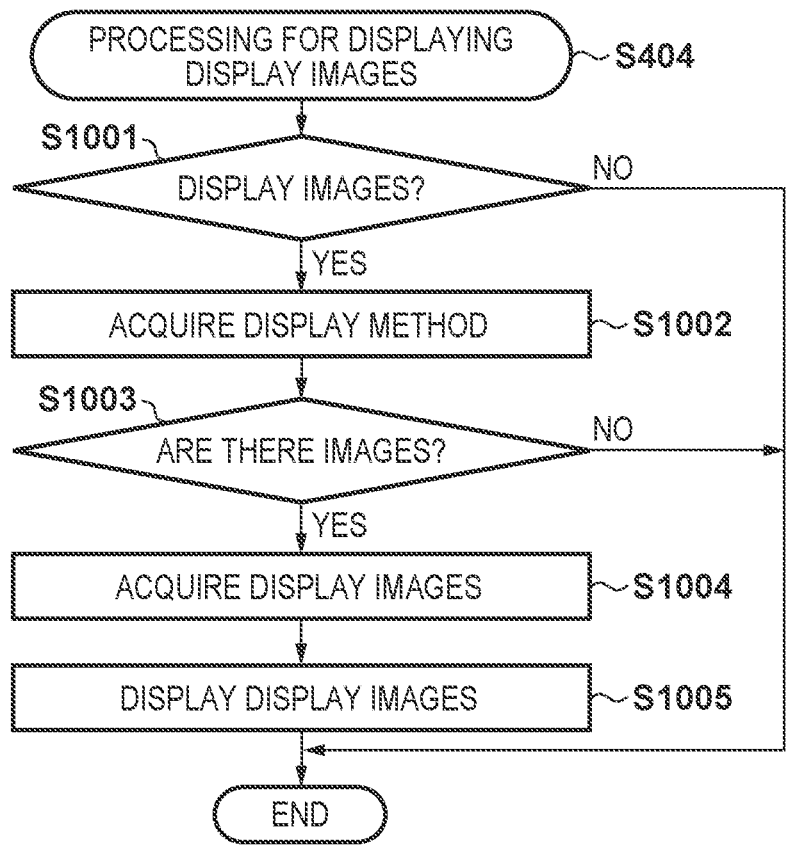
FIG. 10 is a flowchart describing processing for displaying the display images pertaining to the first embodiment.

FIG. 10 is a flowchart describing processing for displaying display images pertaining to the first embodiment. The display processing in step S404 of FIG. 4 will be described in detail with reference to FIG. 10.

In step S1001, based on display settings set via the display unit 108, the updating unit 207 determines whether or not display images are to be displayed. Upon determining that display images are not to be displayed (No in step S1001), the updating unit 207 terminates processing. Upon determining that display images are to be displayed (Yes in step S1001), the updating unit 207 advances processing to step S1002.

In step S1002, based on the display settings set via the display unit 108, the updating unit 207 acquires a display method of display images. Here, for example, the display method specifies whether, in a case in which print-failure regions are detected from a read image, all regions are to be displayed in accordance with ranks of priority based on the display defining image 540 or only regions with high display priority degrees are to be displayed.

In step S1003, the updating unit 207 determines whether or not display images generated in step S904 are present. Upon determining that display images are not present (No in step S1003), the updating unit 207 terminates processing. Upon determining that display images are present (Yes in step S1003), the updating unit 207 advances processing to step S1004.

In step S1004, the updating unit 207 acquires the display images from the memory unit 104.

In step S1005, the updating unit 207 displays the display images on the display unit 108 and terminates processing.

As mentioned above, according to the first embodiment, a display defining image is generated based on print settings and inspection settings. Thus, if print-failure regions are detected, the image processing apparatus can determine ranks of priority of the regions to be displayed based on the display defining image. According to the first embodiment, work efficiency relating to the inspection of printed matter can be improved by providing a user with images corresponding to regions that are to be checked with priority in consideration of the printing work flow.

Second Embodiment

There are cases in which, based on print-failure regions detected in a read image, the user would like to check print-failure regions in further detail or to integrate print-failure regions. In view of this, in the second embodiment, a display defining image acquired in advance is updated based on an image analysis result that includes information such as images and characters acquired by analyzing a printed image that is based on print data, and an inspection result of a read image. Thus, an inspection result based on the image analysis result can be presented to the user. In the second embodiment, differences from the first embodiment will be described.

Figure 11:
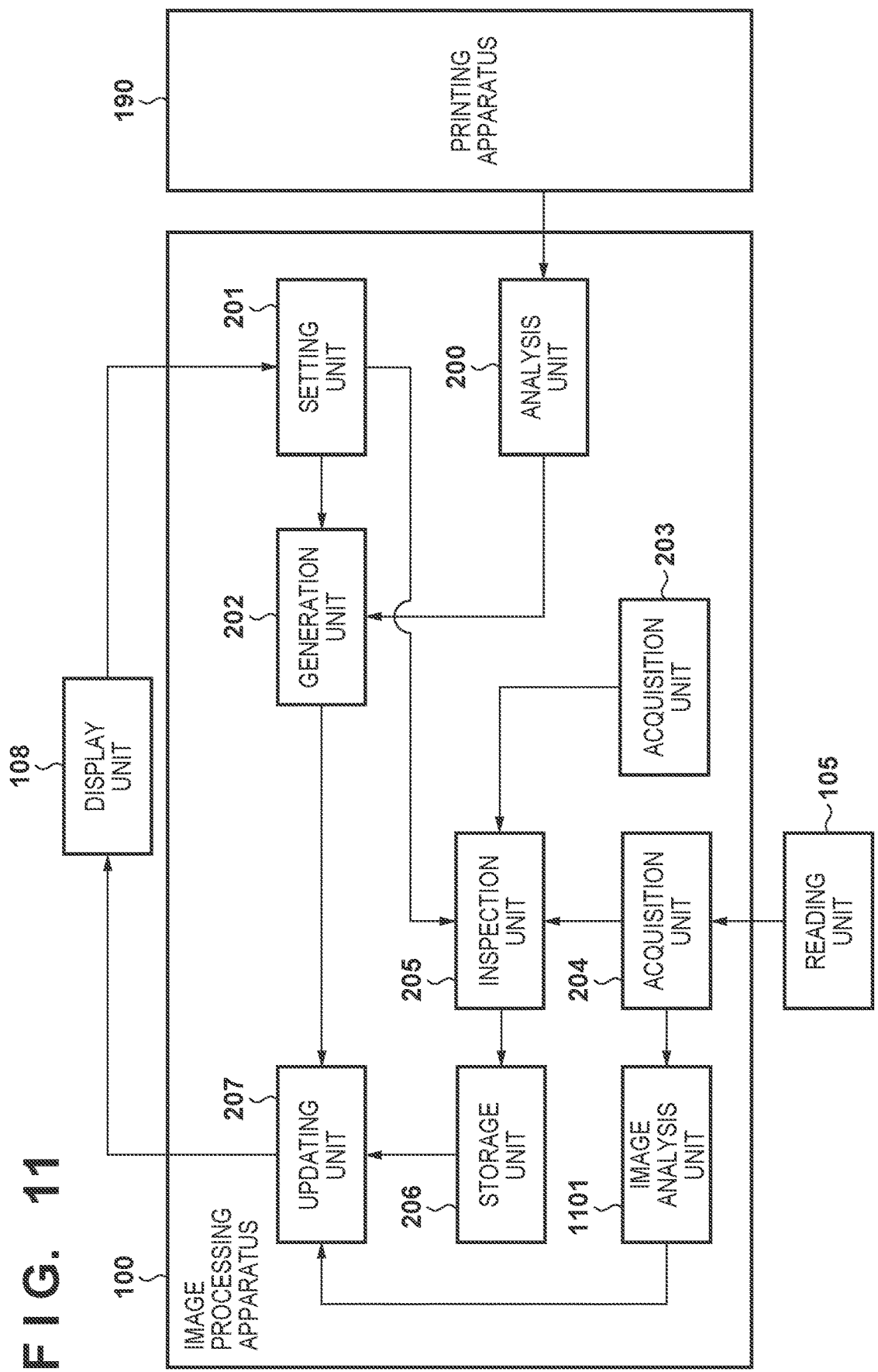
FIG. 11 is a block diagram illustrating one example of a functional configuration of the image processing apparatus pertaining to a second embodiment.

FIG. 11 is a block diagram illustrating one example of a functional configuration of the image processing apparatus pertaining to the second embodiment. The image processing apparatus 100 further includes an image analysis unit 1101. The rest of the configurations of the image processing apparatus 100 are the same as those in the first embodiment, and thus description thereof is omitted.

The image analysis unit 1101 analyzes print data acquired by the analysis unit 200. The image analysis unit 1101 acquires information regarding objects such as images, characters, and thin lines included in a printed page by analyzing print data (PDF or the like) subjected to print processing by the printing apparatus 190.

FIG. 12 is a flowchart describing a flow of image processing pertaining to the second embodiment.

In step S1201, the image analysis unit 1101 acquires print data from the analysis unit 200, and analyzes images included in the print data.

In step S1202, the updating unit 207 generates the display defining image 540 based on the print settings 311 and the inspection settings 321 according to the same method as that in the first embodiment.

In step S1203, the inspection unit 205 detects, as print-failure pixels, pixels in which the difference between the reference and read images is more than a threshold. The inspection unit 205 determines that the printed matter has satisfactory quality if no print-failure pixels are detected from the read images. The inspection unit 205 determines that the printed matter has unsatisfactory quality if print-failure pixels are detected from the read images.

In step S1204, the updating unit 207 updates the rank values of the regions in the display defining image 540 based on the result of the image analysis by the image analysis unit 1101 and the result of the inspection by the inspection unit 205.

Figure 13B:
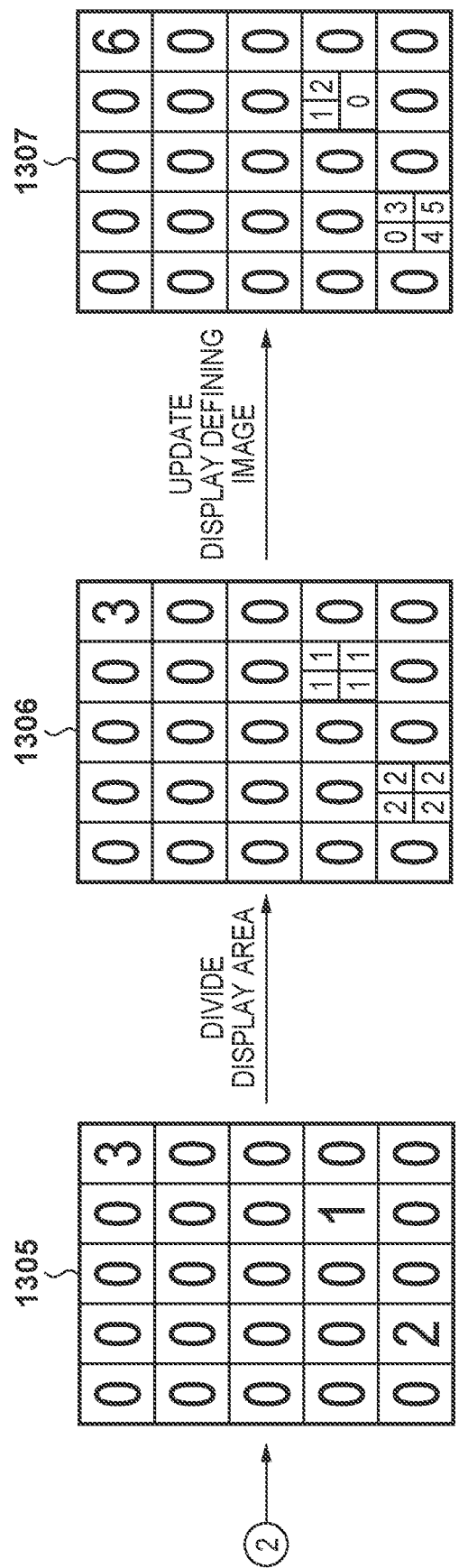
FIG. 13B is a schematic diagram of processing for updating a defining image based on an image analysis result pertaining to the second embodiment.

FIGS. 13A to 13B is a schematic diagram of processing for updating a display defining image based on an image analysis result pertaining to the second embodiment.

The image analysis unit 1101 analyzes each page included in a print job, and acquires an image analysis result for each page. For example, the image analysis unit 1101 acquires an image analysis result for an input image 1300. Based on the image analysis result, the image analysis unit 1101 determines that the input image 1300 is a page including objects, namely an image 1301 and characters 1302. The image analysis unit 1101 sets a distinguishable rank value to each object. For example, the image analysis unit 1101 sets "1" to the region of the image 1301 (region including a cloud and a star), sets "2" to a region of characters 1302 (P1), and sets "0" to other regions. The image analysis unit 1101 generates an image analysis result 1303 in which a rank value is set to each object.

Note that, if an object in which one or more characters are overlaid on an image (e.g., a cloud and a star) is present in the input image 1300, the image analysis unit 1101 determines the object as being either an image object or a character object. The image analysis unit 1101 sets the rank value "1" or "2" to the determined object. Alternatively, the image analysis unit 1101 may classify the determined object as a new region, and may set a new rank value to the new region.

Next, the image analysis unit 1101 acquires an inspection result 1310 from the storage unit 206. Based on the inspection result 1310, the image analysis unit 1101 acquires an inspection result 1311 in which print-failure regions are recorded. The image analysis unit 1101 generates a synthesized image 1304 in which are displayed, among the rank values of the regions in the image analysis result 1303, only the rank values of the regions of the image analysis result 1303 corresponding to the regions in the inspection result 1311 in which "x" (cross mark) is displayed. Thus, the image analysis unit 1101 can distinguish, in the synthesized image 1304, one region in which the rank value "1" is stored and two regions in which the rank value "2" is stored.

The updating unit 207 generates a display defining image 1305 based on the display defining image 540 and the synthesized image 1304. For example, the updating unit 207 generates a display defining image 1305 in which, among the rank values of the regions in the display defining image 540, only rank values of the regions in the display defining image 540 corresponding to the rank values of the regions in the synthesized image 1304 are displayed. Thus, the image analysis unit 1101 can distinguish, in the display defining image 1305, one region in which the rank value "1" is stored, one region in which the rank value "2" is stored, and one region in which the rank value "3" is stored.

Next, the updating unit 207 acquires object information from the image analysis result 1303, and acquires the types of defects (print failures) from the inspection result 1311. Based on the object information (image and characters) and the types of print failures (dots and lines), the updating unit 207 determines whether or not to divide the regions in the display defining image 1305 to which rank values have been set.

Specifically, the updating unit 207 divides each region in which a rank value is recorded based on whether or not the number of print failures in the region is more than or equal to a threshold (e.g., two). Here, according to the inspection result 1310, three dots (illustrated as "." (black circles))

indicating print failures are detected in the region with the rank value "1". According to the inspection result 1310, two lines (illustrated as "-" (lines)) indicating print failures are detected in the region with the rank value "2". According to the inspection result 1310, one dot (illustrated as "." (black circle)) indicating a print failure is detected in the region with the rank value "3". Note that the updating unit 207 counts each dot or line as one print failure.

For example, upon determining that the number of print failures (three) in the region with the rank value "1" is more than or equal to the threshold (e.g., two), the updating unit 207 divides the region with the rank value "1" into four. Upon determining that the number of print failures (two) in the region with the rank value "2" is more than or equal to the threshold (e.g., two), the updating unit 207 divides the region with the rank value "2" into four. Upon determining that the number of print failures (one) in the region with the rank value "3" is less than the threshold (e.g., two), the updating unit 207 refrains from dividing the region with the rank value "3".

Thus, the updating unit 207 can generate a display defining image 1306 by dividing the regions with the rank values "1" and "2". The updating unit 207 generates a display defining image 1307 by updating the rank values of the two regions in the display defining image 1306 that each include four divided regions. For example, the updating unit 207 can update the rank values of the eight regions in total (two regions×four divided regions) based on weight information set in advance to each of the four divided regions, or based on the above-described overlap degree.

Figure 14:
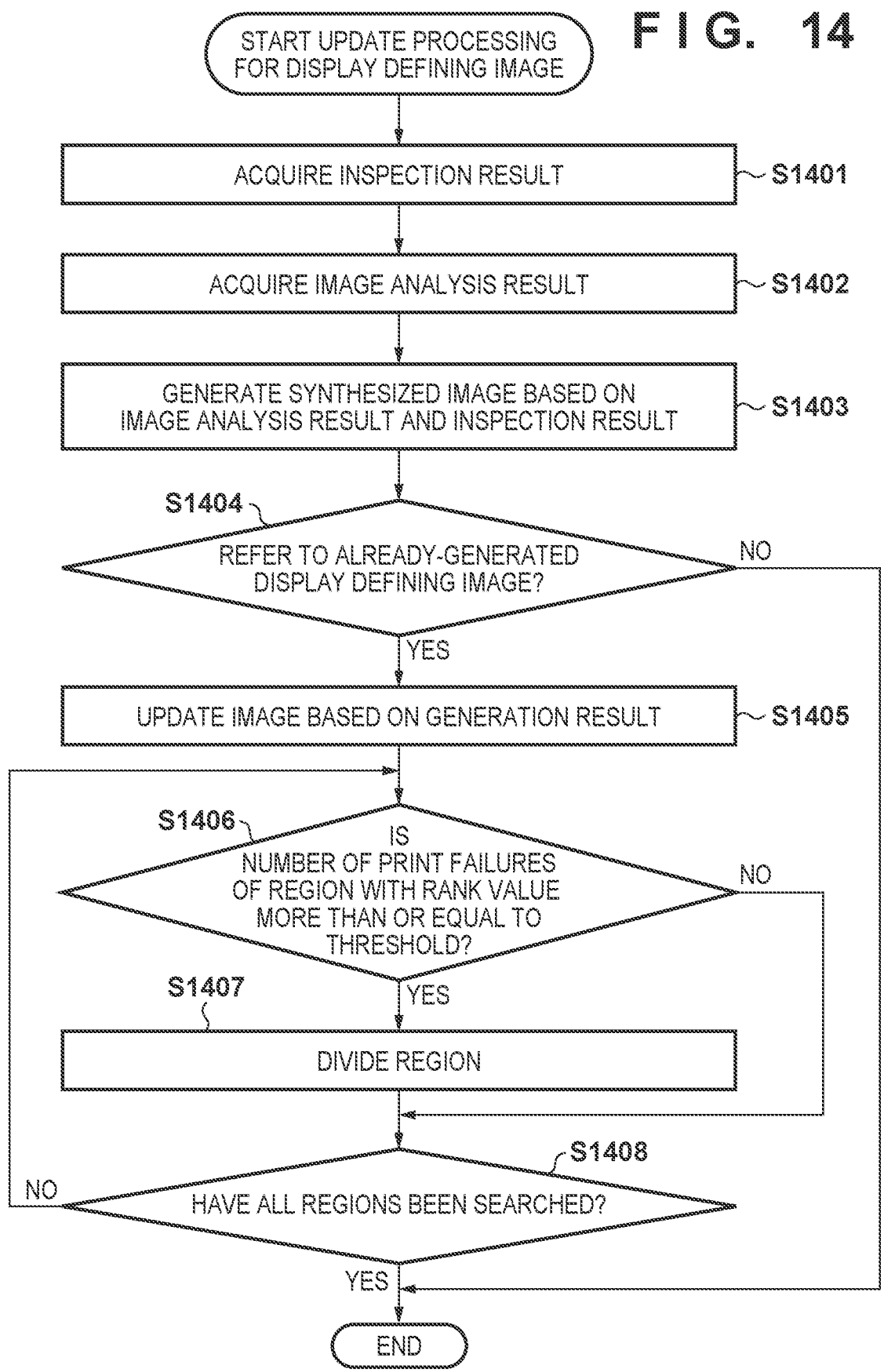
FIG. 14 is a flowchart illustrating a flow of the processing for updating a defining image based on image analysis information.

FIG. 14 is a flowchart illustrating a flow of processing for updating a defining image based on image analysis information.

In step S1401, the updating unit 207 acquires the inspection result 1311 from the storage unit 206.

In step S1402, the updating unit 207 acquires, from the image analysis unit 1101, the image analysis result 1303 of the input image 1300.

In step S1403, the updating unit 207 generates the synthesized image 1304 based on the inspection result 1311 and the image analysis result 1303. The synthesized image 1304 includes information for only regions in which print failures have occurred.

In step S1404, based on whether or not an already-generated display defining image 540 is present, the updating unit 207 determines whether or not to refer to the display defining image 540. Upon determining not to refer to the display defining image 504 (No in step S1404), the updating unit 207 terminates processing. Upon determining to refer to the display defining image 504 (Yes in step S1404), the updating unit 207 advances processing to step S1405.

In step S1405, the updating unit 207 generates the display defining image 1305 based on the display defining image 540 and the synthesized image 1304.

In step S1406, based on whether or not the number of print failures of a region with the rank value in the display defining image 1305 is more than or equal to a threshold, the updating unit 207 determines whether or not to divide the region in which the rank value is recorded. Upon determining that the number of print failures of the region with the rank value in the display defining image 1305 is more than or equal to the threshold (Yes in step S1406), the updating unit 207 divides the region in the display defining image 1305. Upon determining that the number of print failures of the region with rank value in the display defining image 1305 is less than the threshold (No in step S1406), the updating unit 207 advances processing to step S1408.

In step S1407, the updating unit 207 divides the region including rank value in the display defining image 1305 with a number of print failures more than or equal to the threshold into four. Note that the updating unit 207 may determine the number of regions into which the region is to be divided based on the size allocated to one region in the display defining image 1305. Alternatively, the number of regions into which the region is to be divided may be set as appropriate.

In step S1408, the updating unit 207 determines whether or not the determination of whether or not to divide the regions in the display defining image 1305 in which rank values are recorded is complete. Upon determining that the determination of whether or not to divide the regions in the display defining image 1305 in which rank values are recorded is complete (Yes in step S1408), the updating unit 207 terminates processing. Upon determining that the determination of whether or not to divide the regions in the display defining image 1305 in which rank values are recorded is not complete (No in step S1408), the updating unit 207 returns processing to step S1406.

FIG. 15 is a diagram illustrating one example of setting screens displayed on the user interface. The various screens illustrated in FIG. 15 are displayed on the screen (user interface) of the display unit 108.

A screen 1501 is a screen for setting the size of the region when one region in the display defining image 1307 is displayed. The screen 1501 is a setting screen that is referred to in the processing in steps S1205 and S1206. Note that the setting in the screen 1501 may be performed automatically based on the size of the display unit 108, etc. Setting information that can be set on the screen 1501 includes: "display region size" (width and height); "display settings for individual defects", "magnified-display settings", and "settings regarding division of regions in inspection result". The term "defects" has the same meaning as "print failures".

Furthermore, if the user selects "display settings for individual defects" on the screen 1501, the display unit 108 displays a screen 1502. If the user selects "magnified-display settings" on the screen 1501, the display unit 108 displays a screen 1503. If the user selects "settings regarding division of regions in inspection result" on the screen 1501, the display unit 108 displays a screen 1504.

The screen 1502 is a screen for setting regions to be checked from the display defining image 1307. For example, if the "circular defect" check box is ticked in the screen 1502, the display unit 108 displays display images including only regions including circular defects such as dots.

The screen 1503 is a screen for setting the display order in which detected defects are to be displayed, and the number of detected defects to be displayed. Display orders include a defect-degree priority method based on the importance of inspection, and a coordinate priority method to be used to check specific regions. The coordinate priority method is a display method for displaying specific regions by setting coordinates of the specific regions. Note that, if the number of defects detected from the display defining image 1307 is less than the set number of defects to be displayed (e.g., ten), the display unit 108 displays display images including all defects (print-failure regions).

The screen 1504 is a screen for setting a division method to be applied to regions of the display defining image 1307. For example, setting information that can be set in the division method include: whether or not region division is to be performed (e.g., ON), number of defects (e.g., five), region inspection level (e.g., "1"), and category of data inside region (e.g., image).

As described above, according to the second embodiment, a display defining image is generated based on an inspection result and an image analysis result of an input image, and one region in the display defining image is divided into a plurality of regions. Thus, work efficiency relating to the inspection of printed matter can be improved by providing a user with detailed images of important regions from the display defining image.

(Modifications)

In the first and second embodiments, a display defining image is generated based on print settings and inspection settings. However, in a case in which defects are continuously present in a specific region, for example, the updating unit 207 may acquire printing characteristics of the printing apparatus and update the display defining image based on the printing characteristics.

In the second embodiment, a display defining image is generated based on an inspection result and an image analysis result. However, the updating unit 207 may use the image analysis result from an early stage in the processing for generating a display defining image. Furthermore, in a case in which a defect (print-failure) region is located near a boundary region of the display defining image for example, the updating unit 207 may reset the rank value of the region based on the location of the defect region.

Furthermore, the updating unit 207 may generate a plurality of display defining images in advance and store the plurality of display defining images in the memory unit 104 or the like. That is, the user can select, via the user interface, display defining images to be used when printed matter is inspected.

In the above-described embodiments, examples have been described in which an image is used as the defining image to define priority degrees of a plurality of regions in a printed image based on print data. However, the priority degrees do not need to be defined in the form of an image, and may be expressed using positions in an image, or may be expressed by dividing an image into a plurality of partial regions and providing flags indicating priority degrees. In such cases, it suffices that processing as in the above-described embodiments is performed after acquiring information indicating priority degrees and generating a defining image, without directly processing position information or flags serving as defining information indicating priority degrees.

According to the present invention, the efficiency of inspection of printed matter can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-028378, filed Feb. 25, 2022, which is hereby incorporated by reference herein in its entirety.

What is claimed is:

1. An image processing apparatus comprising:
an inspection unit configured to detect, based on a reference image, print failures in a read image obtained by reading a printed image;
a setting unit configured to set, based on a printing condition for printing the printed image, a display order of each of a plurality of print failures detected by the inspection unit; and
a display control unit configured to sequentially display, in the display order, each of the plurality of print failures detected by the inspection unit,
wherein the display control unit displays a print failure corresponding to a first region where a printing material is recorded before displaying a print failure corresponding to a second region where the printing material is not recorded.

2. The image processing apparatus according to claim 1, wherein the setting unit sets the display order with respect to individual regions in the printed image.

3. The image processing apparatus according to claim 1 further comprising an updating unit configured to update the respective display order of a plurality of regions in the printed image based on inspection settings for inspecting the read image.

4. The image processing apparatus according to claim 3 further comprising an analyzing unit configured to analyze objects included in the printed image,
wherein the updating unit updates the respective display order of the plurality of regions based on a result of the analysis by the analyzing unit and an inspection result of the read image.

5. The image processing apparatus according to claim 1, wherein, based on an inspection result of the read image, the display control unit identifies print-failure regions in the read image and displays the identified print-failure regions in the display order.

6. The image processing apparatus according to claim 1, wherein, based on an inspection result of the read image, the display control unit does not display regions in the read image that do not include print-failure regions.

7. The image processing apparatus according to claim 1, wherein the inspection unit detects a print-failure region in the read image based on whether or not a difference between the read image and the reference image exceeds a threshold.

8. The image processing apparatus according to claim 1, wherein print data that is used to print the printed image includes information indicating a printing method, a layout setting, and a sheet size.

9. The image processing apparatus according to claim 3, wherein the inspection settings include information indicating inspection regions in the read image and details of the inspection of the inspection regions.

10. The image processing apparatus according to claim 9, further comprising a user interface for setting the inspection settings and display settings of the print failures.

11. A printing system comprising:
a server for acquiring a print job;
a printing apparatus for printing the printed image based on the print job; and
the image processing apparatus according to claim 1.

12. The image processing apparatus according to claim 1, further comprising an acquiring unit configured to acquire information indicating a type of a print failure,
wherein the display control unit selects, based on the information, a print failure to be displayed.

13. The image processing apparatus according to claim 12, wherein the type of a print failure includes a circular defect and a linear defect.

14. The image processing apparatus according to claim 1, wherein the second region includes (1) a third region that is a binding margin for bookbinding and (2) a fourth region that is not the binding margin, and
wherein the display control unit displays a print failure corresponding to the third region before displaying a print failure corresponding to the fourth region.

15. An image processing method comprising:
detecting, based on a reference image, print failures in a read image obtained by reading a printed image;
setting, based on a printing condition for printing the printed image, a display order of each of a plurality of the detected print failures; and
sequentially displaying, in the display order, each of the plurality of the detected print failures,
wherein, in the displaying, a print failure corresponding to a first region where a printing material is recorded is displayed before a print failure corresponding to a second region where the printing material is not recorded is displayed.

16. A non-transitory computer-readable storage medium storing instructions that, when executed by a computer, cause the computer to perform an image processing method comprising:
detecting, based on a reference image, print failures in a read image obtained by reading a printed image;
setting, based on a printing condition for printing the printed image, a display order of each of a plurality of the detected print failures; and
sequentially displaying, in the display order, each of the plurality of the detected print failures,
wherein, in the displaying, a print failure corresponding to a first region where a printing material is recorded is displayed before a print failure corresponding to a second region where the printing material is not recorded is displayed.

* * * * *